(12) United States Patent
Redler

(10) Patent No.: US 11,863,059 B2
(45) Date of Patent: Jan. 2, 2024

(54) VERSATILE POWER STACK UNIT

(71) Applicant: REDLER TECHNOLOGIES LTD., Kfar Saba (IL)

(72) Inventor: Yesaiahu Redler, Tel Aviv (IL)

(73) Assignee: REDLER TECHNOLOGIES LTD., Kfar Saba (IL)

( * ) Notice: Subject to any disclaimer, the term of this patent is extended or adjusted under 35 U.S.C. 154(b) by 0 days.

(21) Appl. No.: 18/025,959

(22) PCT Filed: Sep. 13, 2021

(86) PCT No.: PCT/IL2021/051113
§ 371 (c)(1),
(2) Date: Mar. 13, 2023

(87) PCT Pub. No.: WO2022/054064
PCT Pub. Date: Mar. 17, 2022

(65) Prior Publication Data
US 2023/0261559 A1 Aug. 17, 2023

(30) Foreign Application Priority Data
Sep. 13, 2020 (IL) .......................................... 277303

(51) Int. Cl.
*H02M 1/00* (2006.01)
*H02J 7/00* (2006.01)
(Continued)

(52) U.S. Cl.
CPC ........... *H02M 1/0048* (2021.05); *B60L 58/10* (2019.02); *H02J 7/0013* (2013.01); *H02J 7/0047* (2013.01);
(Continued)

(58) Field of Classification Search
CPC ............. H02M 1/0048; H02M 1/0074; H02M 3/1582; H02M 3/07; B60L 58/10;
(Continued)

(56) References Cited

U.S. PATENT DOCUMENTS

2014/0368170 A1* 12/2014 Tang ........................ B60L 1/006
320/137
2019/0288528 A1* 9/2019 Greetham ............... B60L 58/19

FOREIGN PATENT DOCUMENTS

CN 103166220 A 6/2013
CN 105762902 A 7/2016
(Continued)

OTHER PUBLICATIONS

PCT Written Opinion for International application No. PCT/IL2021/051113 dated Jan. 13, 2022, 6 pp.
(Continued)

*Primary Examiner* — Jared Fureman
*Assistant Examiner* — Duc M Pham
(74) *Attorney, Agent, or Firm* — The Roy Gross Law Firm, LLC; Roy Gross

(57) ABSTRACT

A "Versatile Power Stack Unit" (VPSU) for controlling electrical devices such as motors for electric vehicles is disclosed. The VPSU uses a DC/DC buck-boost converter that generates output voltage. By varying the voltage according to need, the system can maintain a Pulse-Width Modulation duty cycle of 50% without introducing any ripple current or voltage into the batteries or system, while minimizing losses due to internal resistance. Any number of VPSUs can be connected one to the other in order to provide the voltage and current needed to power the electrical device. Not only does the VPSU minimize ripple current and losses due to internal resistance, but it enables recharging at low voltage and according to the needs of small numbers of
(Continued)

batteries with minimal temperature rise during the charging, thereby extending battery lifetime and improving battery performance.

20 Claims, 12 Drawing Sheets

(51) Int. Cl.
    *H02P 27/08*     (2006.01)
    *H02M 1/14*     (2006.01)
    *B60L 58/10*     (2019.01)
    *H02M 3/158*     (2006.01)
    *H02M 3/07*     (2006.01)

(52) U.S. Cl.
    CPC ........... *H02M 1/0074* (2021.05); *H02M 1/14* (2013.01); *H02M 3/1582* (2013.01); *H02P 27/08* (2013.01); *B60L 2210/12* (2013.01); *B60L 2210/14* (2013.01); *B60L 2240/545* (2013.01); *B60L 2240/547* (2013.01); *B60L 2240/549* (2013.01); *H02J 2207/20* (2020.01); *H02M 3/07* (2013.01)

(58) Field of Classification Search
    CPC ............ B60L 2210/12; B60L 2240/545; H02J 7/0013; H02J 2207/20; H02P 27/08
See application file for complete search history.

(56) References Cited

FOREIGN PATENT DOCUMENTS

| CN | 107623363 | A | | 1/2018 | |
|---|---|---|---|---|---|
| CN | 207039477 | U | | 2/2018 | |
| CN | 207368684 | U | * | 5/2018 | ............... H02J 7/00 |
| CN | 207368684 | U | | 5/2018 | |
| EP | 2800230 | A1 | | 11/2014 | |
| EP | 3369151 | A1 | | 9/2018 | |
| EP | 2393195 | B1 | | 10/2019 | |

OTHER PUBLICATIONS

PCT Search Report for International application No. PCT/IL2021/051113 dated Jan. 13, 2022, 4 pp.

Wang, D.; Bao, Y.; Shi, J. "Online Lithium-Ion Battery Internal Resistance Measurement Application in State-of-Charge Estimation Using the Extended Kalman Filter," Energies 2017, 10(9), 1284 (2017).

Zhang, J.; Jin, L. "Modeling of DC link Capacitor Current Ripple for Electric Vehicle Traction Converter," OTREC-SS-634; Portland, OR: Transportation Research and Education Center (TREC), 2010; DOI https://doi.org/10.15760/trec.40.

Ma, S. et al (2018) . "Temperature Effect and Thermal Impact in Lithium-Ion Batteries: a Review," Prog. Nat. Sci.—Mater. 2018, 28, 653, https://doi.org/10.1016/j.pnsc.2018.11.002.

* cited by examiner

FIG. 1A   FIG. 1B   FIG. 1C
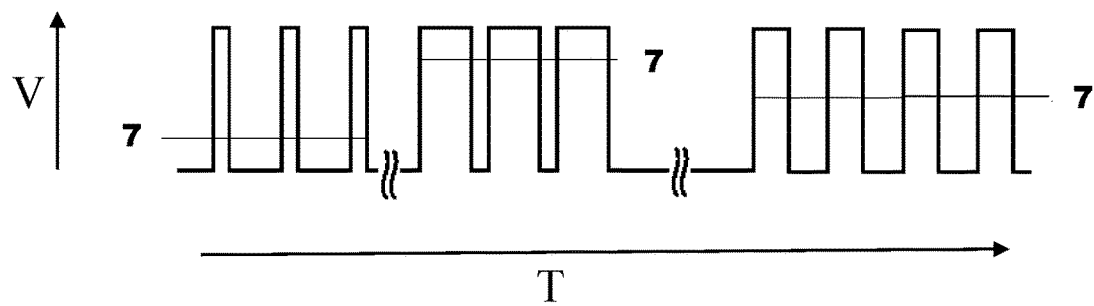
*Prior art*
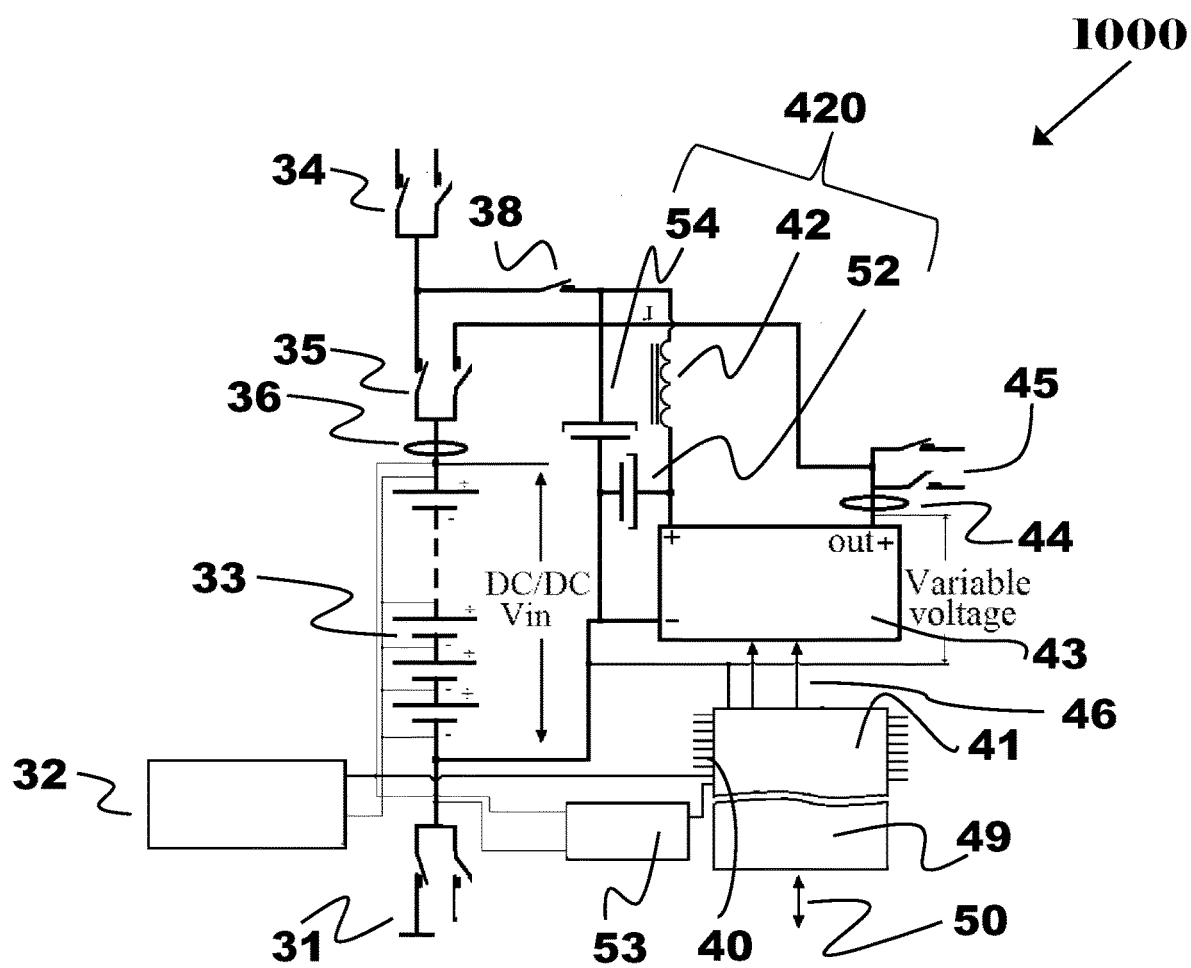
FIG. 2

Time (ms)

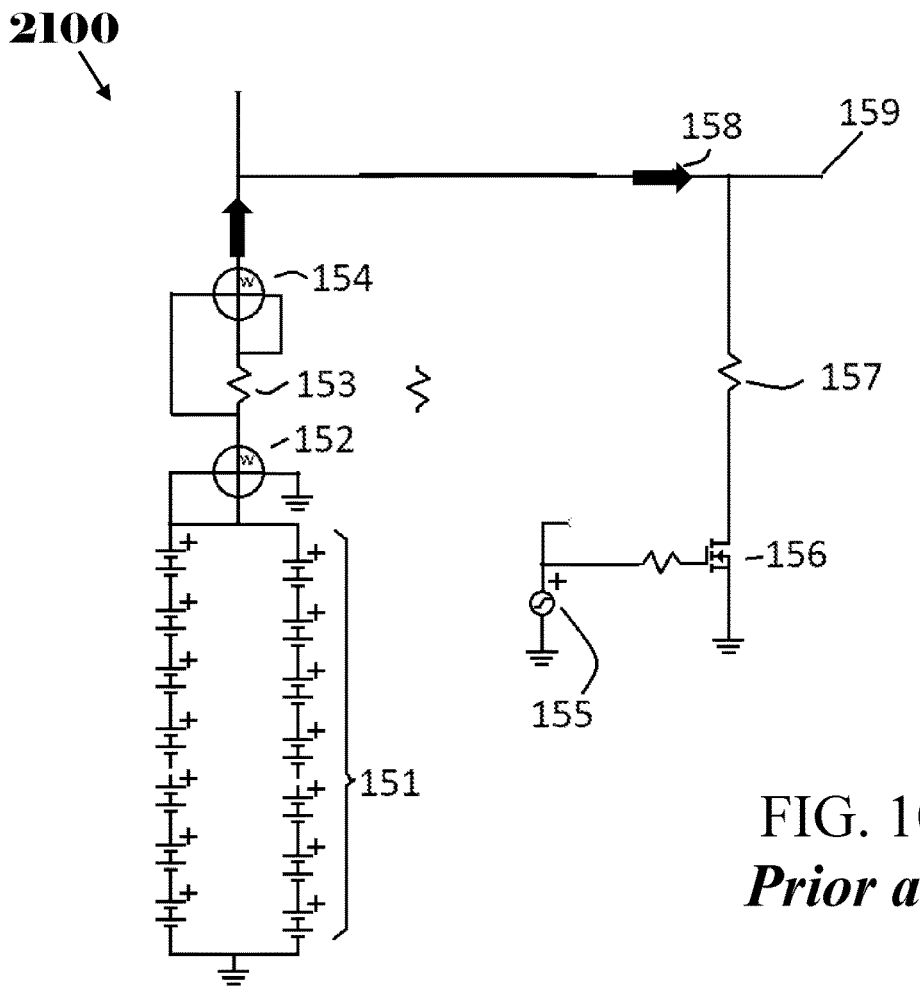
FIG. 10
*Prior art*
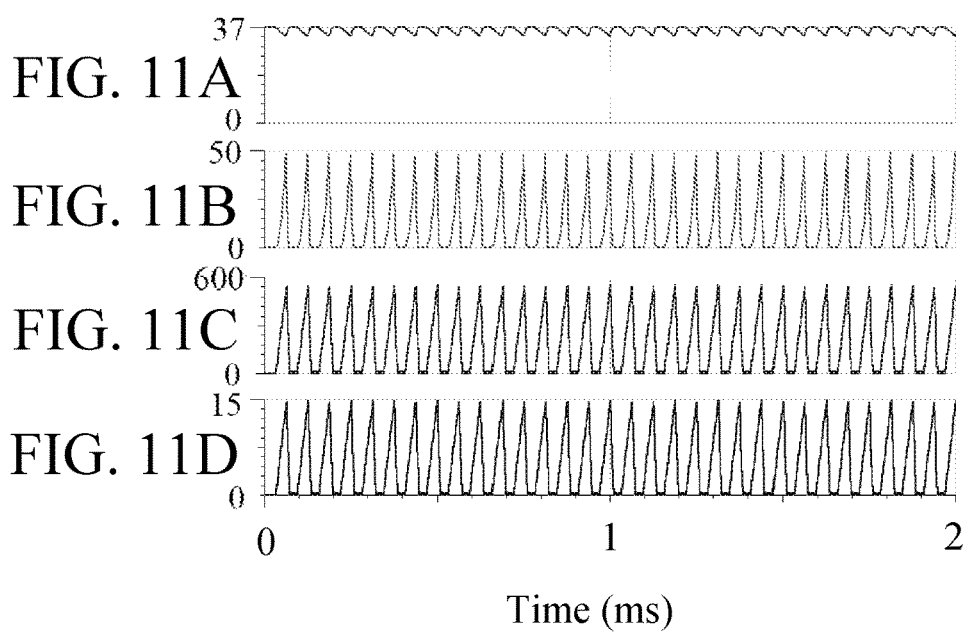
FIG. 11A
FIG. 11B
FIG. 11C
FIG. 11D
Time (ms)

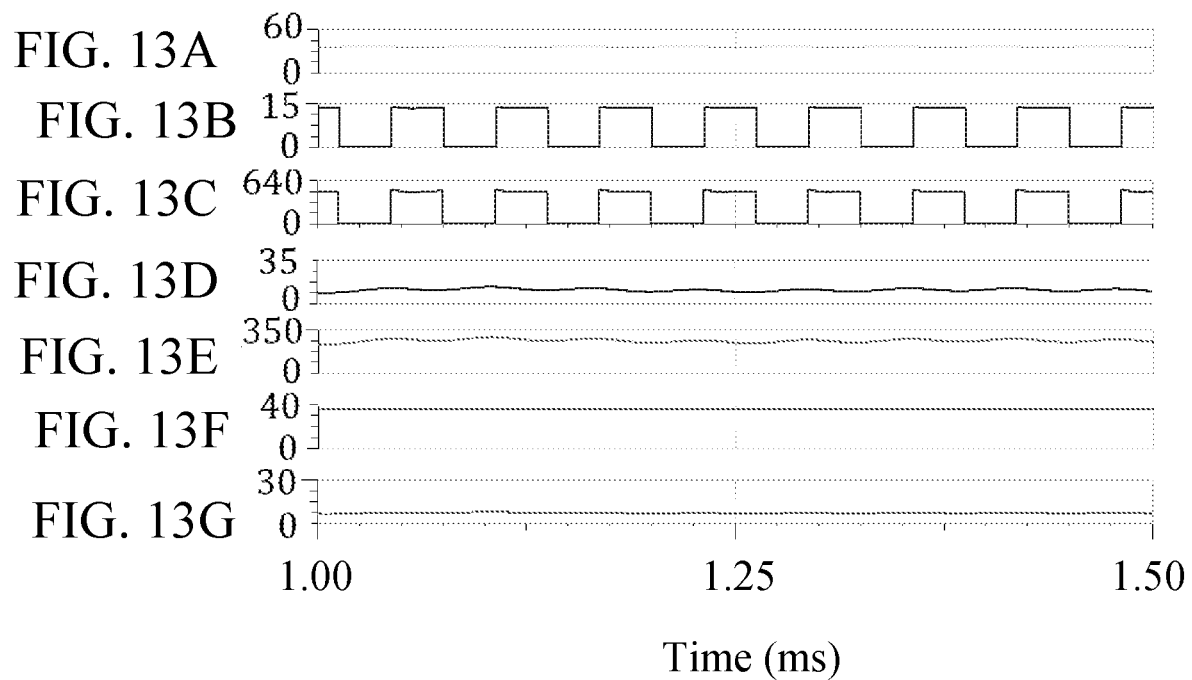
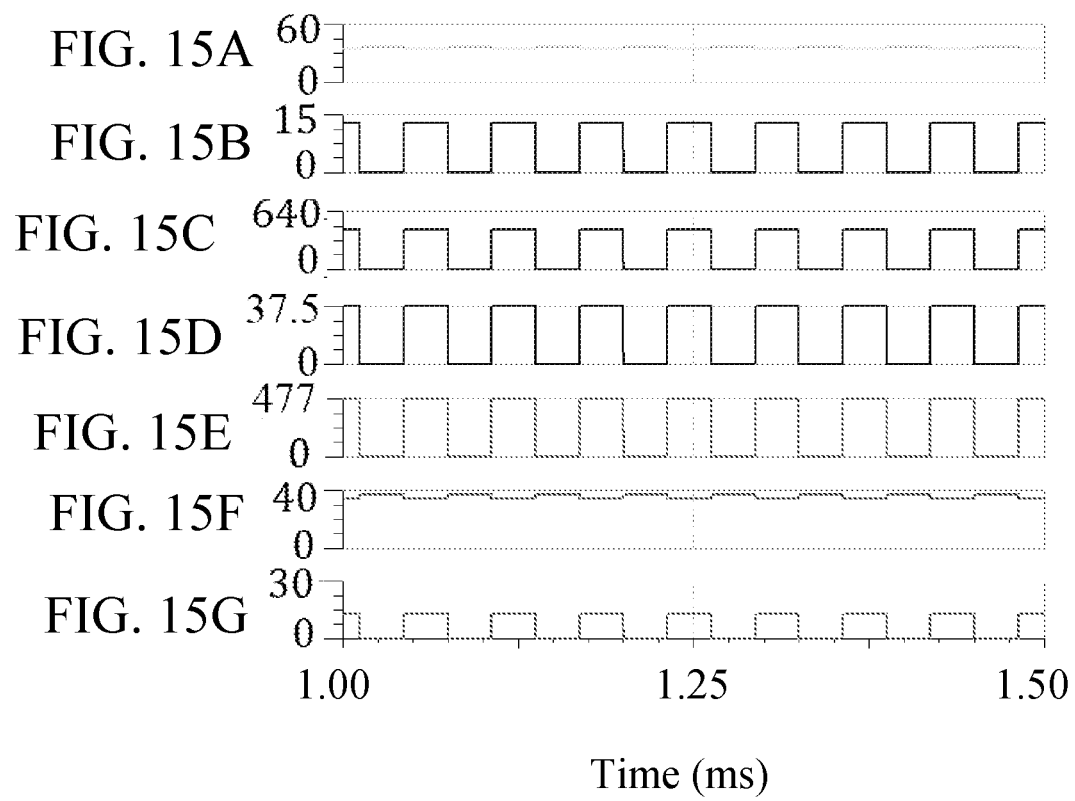

VERSATILE POWER STACK UNIT

CROSS-REFERENCE TO RELATED PUBLICATIONS

This application is the United States national phase filing under 35 U.S.C. 371 of PCT (International) Pat, Appl. No. PCT/IL2021/051113, filed 13 Sep. 2021, and claims priority from Israel Pat. Appl. No. 277303, filed 13 Sep. 2020, both of which are incorporated by reference in their entirety.

FIELD OF THE INVENTION

This invention relates in general to means and methods for controlling electric motors and batteries. It relates specifically to means and methods for reducing battery internal losses and radio interference by reducing the ripple current experienced by the batteries in controllers that provide pulse-width modulation (PWM) power signals to an electric motor such that of an electric vehicle.

BACKGROUND OF THE INVENTION

The power train efficiency of electric vehicles (EVs) depends heavily on efficient use of the batteries. The maximum long-term power efficiency in EVs is achieved when the power losses at the typical motor current are minimized.

Power losses in batteries, wires, and electric motors are manifested as extra heat generated by the devices. This generation of heat not only represents a loss of power, as the energy of the battery is transferred to heat rather than to kinetic energy, but is also one of the main factors in causing reduced performance and wearing out of batteries.

The power applied to the motor can be controlled by varying the width of the applied voltage pulses (pulse width modulation, PWM), thereby varying the voltage and as a consequence the current supplied to the motor winding. Assuming a constant voltage power source, the power applied to the motor can be controlled by modulating the timing of the pulses, with the amount of power applied to the motor is correlated to the length of the pulse. Reference is now made to FIGS. 1A-1C, which illustrate the influence of the pulse width on the average voltage supplied. As can be seen from the figure, the wider the pulse width, the greater the average voltage (7) and hence the current applied to the motor terminals. A higher current will increase the magnetic flux inside the motor stator windings, thereby causing the motor to rotate faster or to transfer more torque or both. Note that when the duty cycle is 50%, the average voltage is the average of the maximum and minimum values.

Every battery has an internal resistance that correlates inversely with the speed capability of the battery to create ions; the ability of the battery to create ions likewise correlates with its ability to supply current to the load.

The discharge rate of a battery is typically expressed as a function of "C," the current at the value of the nominal battery capacity in Ah. We consider as an example the commercially available Panasonic NCR 18650B lithium ion battery, which has a nominal capacity of 3.25 Ah, and a discharge current (1 C) of 3.25 A. The internal resistance increases when the state of charge decreases. For example, when the battery is 90% charged, the internal resistance is 36.2 m$\Omega$, and when the battery is 25% charged, the internal resistance is 38 m$\Omega$. After 600 charge/discharge cycles, when the battery is 90% charged, the internal resistance is 42 m$\Omega$, and when the battery is 25% charged, the internal resistance is 43.8 m$\Omega$ (Wang, D.; Bao, Y.; Shi, J. "Online Lithium-Ion Battery Internal Resistance Measurement Application in State-of-Charge Estimation Using the Extended Kalman Filter," *Energies* 2017, 10(9), 1284).

A second problem with motor controllers in EV systems is the ripple current, typically 5-30 kHz, caused by the medium-frequency draw on the battery due to the rapid PWM cycles. In systems known in the art, this problem is generally addressed by connecting a capacitor between the positive EV battery system terminal and the negative battery terminal (ground). Bulky high-capacitance DC link capacitors are typically used at the input of the traction inverter to provide a smooth DC input voltage. These DC link capacitors, which occupy nearly half of the volume of the motor controller, can contribute more than 20% of the total cost of the traction inverter. They are generally overdesigned in order to assure a large safety margin during the fast-transient operation of the electric machine(s); see Zhang, J.; Jin, L. "Modeling of DC link Capacitor Current Ripple for Electric Vehicle Traction Converter," OTREC-SS-634; Portland, OR: Transportation Research and Education Center (TREC), 2010; DOI https://doi.org/10.15760/trec.40.

A third problem associated with a motor controller is the torque/speed ratio. In general, when the speed of the motor increases, the torque decreases, primarily due to back EMF, which generates voltage opposing the motor driver voltage, thereby reducing the motor current at a given battery voltage. Since the torque is directly proportional to the magnetic flux and the magnetic flux is directly proportional to the current and hence to the back EMF, reducing the current will thus reduce the torque. Existing systems deal with this problem by changing the bus voltage, typically by using step up inverters. The main disadvantages of this method are its low efficiency, high current high voltage DC/DC converters typically having an efficiency of 83-87%, and its expense.

As shown in detail in the examples given below, in a typical EV system, battery losses to heat are typically on the order of 10%. Minimization of this loss is critical to efficient use and prolonging the life of batteries in EV applications.

Reducing the heat losses from PWM ripple current pulses experienced by the battery will greatly enhance the efficiency of the system and extend the lifetime of each battery. An efficient and cost-effective solution to the problems discussed above thus remains a long-felt, but as yet unmet, need.

SUMMARY OF THE INVENTION

The invention disclosed herein is designed to meet this need. Disclosed herein is the "Versatile Power Stack Unit" (VPSU), a system that can be used as a building block for larger systems. The system disclosed herein incorporates a small number of batteries, allowing storage of the excessive high-level part of the PWM current, and transfer of the stored current during the low-level part of PWM pulse. An inductor and a capacitor are used to provide comprises magnetic field storage and voltage charge storage. In order to increase the efficiency of this storage technique, the PWM frequency is upconverted up to 15-20 times, thereby allowing high efficiency usage of small, low-cost inductors and capacitors, and a control system comprising one or more VPSUs. The VPSU incorporates a DC/DC converter, preferably a buck-boost converter, to achieve high efficiency at a nominal 50% PWM duty cycle. The EV battery pack can comprise any number Versatile Power Stack Units (VPSUs) according to the specific needs of the user. EV battery units comprising VPSUs reduce or eliminate ripple voltage and current, and significantly reduce power losses relative to similar systems known in the prior art.

It is therefore an object of the present invention to disclose a system for controlling an electrical device, said system comprising a versatile power stack unit (VPSU), said VPSU comprising:
- a lower column switch (31);
- an upper column switch (34);
- a charge/discharge switch (35);
- a voltage output switch (45) configured to provide an electrical connection between said VPSU and said electrical device;
- a battery pack (33) comprising at least one battery stack, each battery stack comprising a plurality of batteries connected in series;
- a DC/DC input switch (38);
- a Micro-Controller Unit (MCU) (41);
- a galvanically isolated interface (49);
- electric storage elements arranged as an CLC low-pass filter (420);
- a DC/DC voltage converter (43) comprising a negative input, a positive input, and a DC/DC variable positive voltage output;
- a negative terminal connector in electrical connection with said negative input of said DC/DC voltage converter and configured to accept a negative terminal of a battery; and,
- a positive terminal connector configured to accept a positive terminal of a battery;

wherein:
- said lower column switch provides a switchable electrical connection (311) between said negative terminal connector and ground;
- said upper column switch is disposed in series between said charge/discharge switch and said connection configured to be connected to an external source of electricity;
- said battery pack is connected to said lower column switch and to said upper column switch via said charge/discharge switch;
- said positive terminal connector is connected to said positive input of said DC/DC voltage converter via said DC/DC input switch and said low-pass filter;
- said MCU is characterized by sufficient computing power to allow a dynamic charge current loop >100 kHz; comprises a switch control configured to set switches in said system; is in data connection with said DC/DC voltage converter and is configured to send control signals to said DC/DC voltage converter; and is configured to be in data connection with at least one external controller via said galvanically isolated interface; and,
- said charge/discharge switch is a multiple-throw switch that when connected in a first configuration (351) provides an electrical connection between said positive terminal connector and a terminal of said voltage output switch, and when connected in a second configuration (352) provides an electrical connection between said positive terminal connector and a connection configured to be connected to an external source of electricity.

It is a further object of this invention to disclose such a system, wherein said DC/DC voltage converter is a buck-boost converter.

It is a further object of this invention to disclose the system as defined in any of the above, wherein said system comprises a battery management system (32) configured to monitor each cell of said battery and control to current and voltage on each cell of said battery.

It is a further object of this invention to disclose the system as defined in any of the above, wherein said system comprises measuring means for measuring at least one parameter selected from the group consisting of battery voltage, battery current, battery temperature, voltage output, and current output.

It is a further object of this invention to disclose the system as defined in any of the above, wherein said electrical device comprises at least one electric motor.

It is a further object of this invention to disclose the system as defined in any of the above, wherein said at least one motor drive controller is configured to maintain a pulse-width modulated (PWM) output signal. In some preferred embodiments of the invention, said PWM output signal is characterized by a duty cycle of about 50%.

It is a further object of this invention to disclose the system as defined in any of the above, wherein at least one of said switches comprises: n inputs (92), n≥1; n low-pass filters (94), each low-pass filter having an entrance and an exit, each of said entrances connected in series with one of said n inputs; a charge pump (95) in electrical connection with said exit of each of said low-pass filters, said charge pump comprising oscillator circuitry sufficient to generate a VGS voltage >10V; n gate drivers (96), each in electrical connection with said exit of one of said low-pass filters; n diodes (97) connected as a common cathode; a transistor (98) on a common side of said switch, configured such that when at least one of said gate drivers is asserted, said diodes open a gate of said transistor; n normally open transistors (99), each of which is in electrical connection with one of said gate drivers and said common transistor; a shunt resistor (100) in series with said transistor (98); an amplifier (101) configured to transmit current that has passed through said shunt resistor; and, a comparator (103) configured to trigger a shutdown of any of said normally-open transistors if a short circuit increases current through said switch above a predetermined level.

It is a further object of this invention to disclose the system as defined in any of the above, wherein: said lower column switch is a multiple-throw switch that when connected in a first configuration (311) provides an electrical connection between said negative terminal connector and ground, and when connected in a second configuration (312) provides an electrical connection between said negative terminal connector and a connection configured to provide a first electrical connection to a device external to said system; said VPSU comprises and, said voltage out switch is a multiple-throw switch that when connected in a first configuration (451) provides an electrical connection between said DC/DC variable positive voltage output and an external load and when connected in a second configuration (452) provides an electrical connection between said DC/DC variable positive voltage output and a connection configured to provide a second electrical connection to a device external to said system.

It is a further object of this invention to disclose a system for controlling an electric device, said system comprising a plurality of n versatile power stack units (VPSUs), each VPSU comprising:
- a lower column switch (31*n*);
- an upper column switch (34*n*);
- a charge/discharge switch (35*n*);
- a voltage output switch (45*n*) configured to provide an electrical connection between said VPSU and said electrical device;

a battery pack (33n) comprising at least one battery stack, each battery stack comprising a plurality of batteries connected in series;

a DC/DC input switch (38n);

a Micro-Controller Unit (MCU) (41n);

a galvanically isolated interface (49n);

electric storage elements arranged as a CLC low-pass filter (420n);

a DC/DC voltage converter (43n) comprising a negative input, a positive input, and a DC/DC variable positive voltage output;

a negative terminal connector in electrical connection with said negative input of said DC/DC voltage converter and configured to accept a negative terminal of a battery; and, a positive terminal connector configured to accept a positive terminal of a battery;

wherein:

each of said lower column switches (31n) provides a switchable electrical connection (311n) between said negative terminal connector of said VPSU n and ground;

each of said lower column switches (31n) is a multiple-throw switch that when connected in a first configuration (311n) provides an electrical connection between said negative terminal connector of said VPSU n and ground, and when connected in a second configuration (312n) provides an electrical connection between said negative terminal connector of said VPSU n and a connection configured to provide a first electrical connection to a device external to said system;

each of said upper column switches (34n) is disposed in series between said charge/discharge switch of said VPSU n and said connection configured to be connected to an external source of electricity;

each of said battery packs (33n) is connected to said lower column switch of VPSU n (31n) and to said upper column switch of VPSU n (34n) via said charge/discharge switch of VPSU n (35n);

said positive terminal connector of said VPSU n in electrical connection with said positive input of said DC/DC voltage converter of said VPSU n (43n) via said DC/DC input switch of said VPSU n and said low-pass filter of said VPSU n (420n);

each of said MCUs (41n):
  is characterized by sufficient computing power to allow a dynamic charge current loop >100 kHz;
  comprises a switch control configured to set switches in said system;
  is in data connection with said DC/DC voltage converter and is configured to send control signals to said DC/DC voltage converter; and,
  is configured to be in data connection with at least one external controller via said galvanically isolated interface; and, each of said charge/discharge switches (35n) is a multiple-throw switch that when connected in a first configuration (351n) provides an electrical connection between said positive terminal connector and a terminal of said DC/DC voltage output, and when connected in a second configuration (352n):
  for VPSU n, provides an electrical connection between said positive terminal connector and a connection configured to be connected to an external source of electricity;
  for each VPSU m, m<n, provides an electrical connection with said lower column switch of VPSU m+1.

It is a further object of this invention to disclose such a system comprising a plurality of n (VPSUs), wherein at least one of said switches comprises: n inputs (92n), n≥1; n low-pass filters (94n), each low-pass filter having an entrance and an exit, each of said entrances connected in series with one of said n inputs; a charge pump (95n) in electrical connection with said exit of each of said low-pass filters, said charge pump comprising oscillator circuitry sufficient to generate a VGS voltage >10V; n gate drivers (96n), each in electrical connection with said exit of one of said low-pass filters; n diodes (97n) connected as a common cathode; a transistor (98n) on a common side of said switch, configured such that when at least one of said gate drivers is asserted, said diodes open a gate of said transistor; n normally open transistors (99n), each of which is in electrical connection with one of said gate drivers and said transistor (98n); a shunt resistor (100n) in series with said common transistor; an amplifier (101n) configured to transmit current that has passed through said shunt resistor; and, a comparator (103n) configured to trigger a shutdown of any of said normally-open transistors if a short circuit increases current through said switch above a predetermined level.

It is a further object of this invention to disclose such a system comprising a plurality of n (VPSUs) as defined in any of the above, wherein at least one of said DC/DC voltage converters is a buck-boost converter.

It is a further object of this invention to disclose such a system comprising a plurality of n (VPSUs) as defined in any of the above, wherein at least one of said VPSUs compresses a battery management system (32) configured to monitor each cell of said battery and control to current and voltage on each cell of said battery.

It is a further object of this invention to disclose such a system comprising a plurality of n (VPSUs) as defined in any of the above, comprising measuring means for measuring at least one parameter selected from the group consisting of battery voltage, battery current, battery temperature, voltage output, current output.

It is a further object of this invention to disclose such a system comprising a plurality of n (VPSUs) as defined in any of the above, wherein said electrical device comprises at least one electric motor.

It is a further object of this invention to disclose such a system comprising a plurality of n (VPSUs) as defined in any of the above, wherein said at least one motor drive controller is configured to maintain a pulse-width modulated (PWM) output signal. In some preferred embodiments of the invention, said PWM output signal is characterized by a duty cycle of about 50%.

It is a further object of this invention to disclose such a system comprising a plurality of n (VPSUs) as defined in any of the above, wherein: at least one of said lower column switches is a multiple-throw switch that when connected in a first configuration (311) provides an electrical connection between said negative terminal connector and ground, and when connected in a second configuration (312) provides an electrical connection between said negative terminal connector and a connection configured to provide a first electrical connection to a device external to said system; at least one of said VPSUs comprises an upper column switch (34n) disposed in series between said charge/discharge switch and said connection configured to be connected to an external source of electricity; and, said voltage out switch is a multiple-throw switch that when connected in a first configuration (451) provides an electrical connection between said DC/DC variable positive voltage output and an external load and when connected in a second configuration (452)

provides an electrical connection between said DC/DC variable positive voltage output and a connection configured to provide a second electrical connection to a device external to said system.

It is a further object of this invention to disclose such a system comprising a plurality of n (VPSUs) as defined in any of the above, wherein said plurality of VPSUs are connected in series.

It is a further object of this invention to disclose such a system comprising a plurality of n (VPSUs) as defined in any of the above, wherein said plurality of VPSUs are connected in parallel.

It is a further object of this invention to disclose such a system comprising a plurality of n (VPSUs) as defined in any of the above, wherein: said plurality of VPSUs is divided into plurality of groups, each of which contains at least one VPSU; within each group that contains more than one VPSU, said VPSUs within that group are connected one to another in series; and, said groups are connected one to another in parallel.

It is a further object of this invention to disclose such a system comprising a plurality of n (VPSUs) as defined in any of the above, wherein: said plurality of VPSUs is divided into plurality of groups, each of which contains at least one VPSU; within each group that contains more than one VPSU, said VPSUs within that group are connected one to another in parallel; and, said groups are connected one to another in series.

It is a further object of this invention to disclose a method for low-voltage charging of a plurality of batteries, wherein said method comprises:
obtaining a system comprising a plurality of VPSU units as defined in any of the above;
for each of said VPSU units:
  obtaining a plurality of batteries;
  connecting said batteries into at least one stack, wherein within each stack, said batteries are connected in series;
  if said plurality of batteries comprises more than one stack, connecting said stacks of batteries in parallel; and,
  connecting said plurality of batteries between, and in series with said lower column switch (31n) and said charge/discharge switch (35n);
connecting said plurality of VPSU units in parallel via their upper column switches (34n);
connecting one of said VPSU units to a battery charger via its upper column switch (34);
using said battery charger to charge said batteries at a charge current and charge voltage until said batteries are charged;
for each VPSU unit, independently controlling voltage and current output by an analog output of said MCU of said VPSU unit; and,
for each VPSU unit, regulating current by switching a DC/DC bridge of said DC/DC converter with an SD signal of said MCU.

It is a further object of this invention to disclose such a method wherein:
each of said VPSU units comprises temperature measuring means for measuring temperature of said batteries, said temperature measuring means being in data connection with said MCU of said VPSU unit; and,
said method comprises:
  charging said batteries with said charge current characterized by a value greater than 1 C;
  monitoring said temperature of said batteries; and,
  if said temperature of said batteries or a rate of rise of temperature of said batteries exceeds a predetermined limit, reducing said charge current sufficient to reduce said temperature of said batteries or said rate of rise of temperature of said batteries to a value below said predetermined limit.

It is a further object of this invention to disclose the method as defined in any of the above, wherein said method comprises: determining a parameter $\alpha=\Delta V/\Delta I$ where V and I are said charge voltage and charge current, respectively; determining an ionization factor $F_i=\Delta\alpha/\Delta T$, where T is said battery temperature; and, using $F_i$ as input to a feedback loop.

It is a further object of this invention to disclose the method as defined in any of the above, wherein said charge voltage is ≤50 V.

BRIEF DESCRIPTION OF THE DRAWINGS

The invention will now be described with reference to the drawings, wherein:

FIGS. 1A-1C illustrate the influence of the pulse width on the average voltage supplied by a controller, as is known in the prior art;

FIG. 2 is a schematic circuit diagram of one embodiment of the Versatile Power Stack Unit disclosed herein;

FIG. 10 is a schematic diagram of a circuit that emulates systems known in the prior art of a small number (10 in a column 2 rows) of battery cells driving an inductive load such as a motor coil winding of an electric vehicle;

FIGS. 11A-11D present graphically the calculated battery power loss, battery power, motor current, and battery voltage, respectively, for a simulation run using the circuit shown in FIG. 10;

FIGS. 13A-13G present graphically the battery voltage, battery current, voltage output, current output, battery power, and battery loss, for a simulation run using the circuit shown in FIG. 12;

DETAILED DESCRIPTION OF THE PREFERRED EMBODIMENTS

Figure 3:
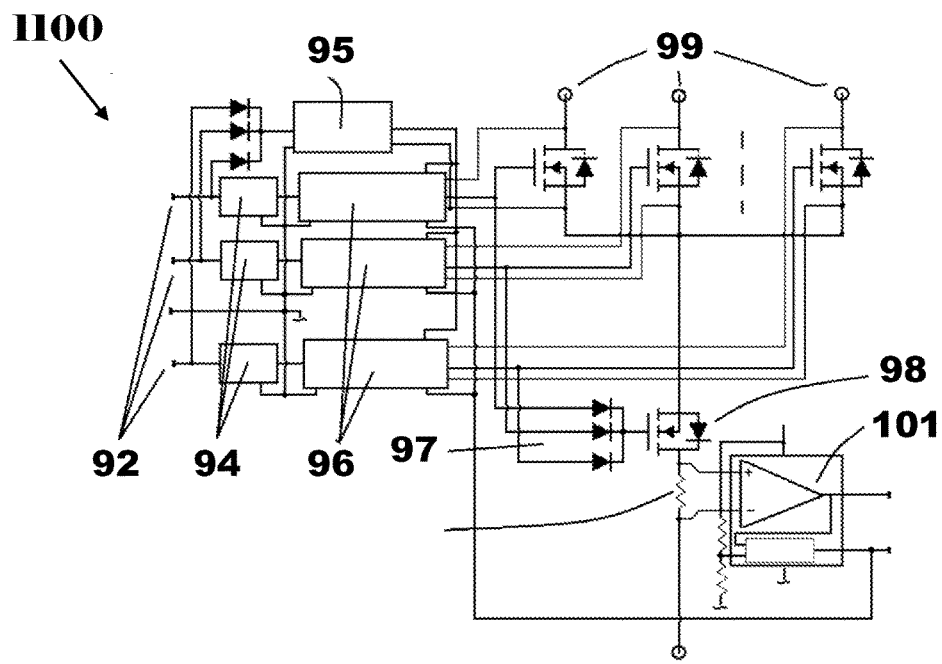
FIG. 3 is a schematic diagram of a bidirectional short-circuit protected multipole switch (BDPS) of the present invention.

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore, the invention is not limited by that which is illustrated in the figures and described in the specification, but only as indicated in the accompanying claims, with the proper scope determined only by the broadest interpretation of said claims.

In some cases, for clarity or conciseness, individual elements of the invention are discussed separately. Nonetheless, any combination of elements of the invention that is not self-contradictory is considered by the inventors to be within the scope of the invention. In addition, some embodiments of the invention are described in terms of "comprising" a set of components, that is, the embodiment includes at least the listed components. Any embodiment of the invention described herein as "comprising" a set of components is considered by the inventor to include within its scope embodiments of the invention that "consist of" the listed components, that is, embodiments that include those components and no others.

As used herein, the term "battery" is used generically to refer to a device capable of generating electricity from chemical reactions. Unless specifically stated otherwise, the term as used herein includes both single-cell and multiple-cell batteries.

As used herein, the abbreviation "VPSU" stands for "Versatile Power Stack Unit."

As used herein, the abbreviation "EV" stands for "Electric Vehicle."

As used herein, the abbreviation "PWM" stands for "Pulse-Width Modulation."

As used herein, within reference numbers, the italicized letter "n" is used to indicate that each of the n identical units incorporates a separate instance of the component. As a non-limiting example, in a system with three units, the notation Xn indicates that one of component X is present in each of the first unit (Xa), the second unit as (Xb), and in the third unit (Xc).

As used herein, with reference to numerical quantities, the term "about" refers to a tolerance of ±20% about the nominal value.

A. VPSU—General Description

Disclosed herein is the Versatile Power Stack Unit (VPSU), a novel means and method for controlling the power source of an electric motor, especially a motor controller driver for the electric motor of an EV. As will be explained below, the VPSU provides high efficiency while limiting the ripple current experienced by the batteries, but avoids the difficulties of systems and methods known in the art.

In commercially available EVs, the battery pack frequently comprises a large number of batteries (e.g. the battery pack of the Tesla 3 comprises 2976 cells, 31 columns of 96 batteries). The manufacturer connects occasionally a high-power DC/DC upconverter; in general, since the system operates at constant voltage, there is no DC/DC converter. The ripple capacitor residing in the motor controller is necessarily large, and the converter is also large, expensive, and uneconomical.

In contrast, in the VPSU disclosed herein, a relatively small battery pack is used (20 in the typical non-limiting embodiments illustrated in the examples given below). The VPSU thus uses small voltages and currents, making it much easier to store energy and to change the voltage. Each VPSU can be treated as an independent unit, a "brick" in the construction of a larger system, and thereby provides the flexibility to construct a system of any desired size.

Reference is now made to FIG. 2, which is a schematic diagram of one non-limiting embodiment 1000 of the VPSU disclosed herein. The VPSU is connected to a battery pack 33 that may contain any number of battery stacks, each of which comprises a plurality of batteries connected in series. In some embodiments, the battery pack includes more than one such serially connected stack of batteries; in these embodiments, the stacks of serially connected batteries are connected in parallel one to the other. For purposes of illustration, the embodiment illustrated in FIG. 2 comprises one stack; this configuration is not intended to be limiting in any way. The VPSU is connected to the battery pack by a switch. The switch may be mechanical (a non-limiting example is a relay) or electrical (non-limiting examples include power transistors, such as MOSFET, SiC, GaN, or IGBT). In preferred embodiments of the invention, the switch is a Bidirectional Short Circuit Protected Multipole Switch (BDPS), described in detail below. In some non-limiting embodiments of the invention, the switch is single pole, single throw. In some other non-limiting embodiments of the invention, the switch is double pole, single throw. In some other non-limiting embodiments of the invention, the switch is triple pole, single throw. Since each VPSU is connected separately to the battery system, all of the switches other than voltage out switch can be rated to low voltage, thereby yielding low loss. In typical non-limiting embodiments of the invention, the switches are rated to 60 V; the voltage out switch is rated according to the maximum output of the serially connected VPSUs, which can be up to hundreds of volts.

The VPSU output voltage is generated by a DC/DC voltage converter 43, preferably a buck-boost converter, which is connected via a switch during discharge time in parallel with the battery stack. Any commercially available DC/DC converter that is appropriate for the desired application can be used. For example, in the embodiment shown in FIG. 2, the nominal input voltage is 37 V, and the nominal output voltage is 37 V as well. Examples of commercially available buck-boost converters that can be used in this system include the Texas Instruments model LM5176, which can achieve efficiencies of 97.7% at 50 V, 97.5% at 25 V, and 99.1% at 37 V. Another commercially available buck-boost converter that can be used in this system is the Analog Devices model LT8228, which has similar efficiencies and a 4.5-100 V input range. In preferred embodiments, the negative input of the DC/DC voltage converter is in electrical connection with a negative terminal connector configured to accept the negative terminal of a battery.

The battery pack is connected to lower column switch 31 and upper column switch 34 via charge/discharge switch 35. The lower column switch is connected to ground signal or, in embodiments in which the system comprises multiple VPSU units, to the upper column switch of a second VPSU during high voltage charging or to the voltage output switch 45 during battery discharge (e.g. while the vehicle is being driven). In some embodiments of the invention, the VPSU additionally includes an optional battery management system (BMS) 32. The BMS is configured to monitor the status of each battery cell, controls the current during high voltage charging, and maintains voltage equality among the battery cells by bypassing the current through the resistor and transistor when the batteries are being charged. When the batteries are being charged, the charger is connected to the VPSU via the upper column switch. Charge/discharge switch 35 is located between the battery stack and upper column switch 34, and controls the current direction when the batteries are being charged in low voltage or high voltage mode. In preferred embodiments, battery current is monitored by battery current sensor 36, which is typically located between the positive terminal of the battery stack and the charge/discharge switch. The battery current sensor can be any suitable device known in the art; non-limiting examples include magnetic sensors and shunt resistor measuring devices (low or high side).

The negative terminal of the lowest battery in the stack is connected to the DC/DC converter negative signal path and is the common GND signal for the DC/DC. The positive terminal of the uppermost battery in the stack is connected to the DC/DC converter signal path through charge/discharge switch 35 and DC/DC switch 38 during the discharge.

Data and management signals are provided to the VPSU by a data connection to the motor controller or EV computer by a galvanically isolated interface 49 that contains the VPSU address in the battery system. When the motor controller or EV main processor calculates that the voltage needs to be changed, then a data packet with the new VPSU arrangement or the new level of voltage output is sent to the micro-controller unit (MCU) 41 of the VPSU via a communication channel 50. Each data packet from the motor controller or EV main processor contains information about the VPSU voltage; the MCU is described in detail below. The MCU of the VPSU follows the command and adjusts the feedback value (reference voltage) of the DC/DC converter. In such case the DC/DC output voltage is varied following the commands. In order to enable a fast response time, the MCU changes the analog feedback value via a D/A output signal. This procedure takes on the order of microseconds.

Micro-controller unit (MCU) 41 is the main control of the VPSU. The MCU computing power must be sufficient to allow a dynamic charge current loop with a frequency of >100 kHz while maintaining low power consumption, preferably less than 100 mW. In preferred embodiments of the invention, the MCU comprises a 32-bit microprocessor and an at least 10 bit digital to analog (D/A) converter. In especially preferred embodiments of the invention, the MCU comprises an at least 12 bit D/A converter. The MCU comprises at least 8 channels of 12 bits of fast analog to digital (A/D) conversion. The MCU comprises at least 64 kb of flash memory for program and long-term nonvolatile data storage and at least 24 kb RAM for computations.

The MCU is in data connection with the main processor and/or EV motor controller, and controls the voltage output of the VPSU and maintains the switch combination for the VPSU mode, as described below. In preferred embodiments of the invention, the MCU is powered by a power supply 53 in electrical connection with the battery stack. The MCU analog input reads analog signals in the VPSU such as the total battery current determined by battery current sensor 36. As described in detail below, the MCU is programmed to receive and to send a variety of instructions and signals to various points in the motor control system. For example, the MCU can change the voltage set point of the DC/DC converter and send a "shut down" (SD) signal to the DC/DC converter as necessary. Depending on the details of the construction of the converter, other signals can be sent by the converter to the MCU. The MCU switch control 48 sets the VPSU switches in order to maintain the correct battery arrangement.

Voltage output switch 45 connects the VPSU to the battery output terminal or, in cases in which more than one VPSU is used, to the lower column switch of the next VPSU. In preferred embodiments of the invention, the voltage output switch is a BDPS.

A low-pass filter 420 is connected between the DC/DC converter input and the positive terminal of the battery stack via at least one switch. In many DC/DC applications, an input capacitor acts as a DC/DC input voltage stabilizer and an inductor is used to reduce RFI/EMI radiation arising from the high speed DC/DC current switching. In embodiments that incorporate an input capacitor, this filter minimizes PWM signals that create ripple current through the batteries. In the non-limiting embodiment shown in FIG. 2, the low-pass filter comprises a charge pool capacitor ($C_{pool}$) 54, a filter inductor ($L_{filter}$) 42 and a filter capacitor ($C_{filter}$) 52. $C_{pool}$ is connected in parallel with the battery and acts as a charge pool that supplies current during the DC/DC PWM ON state to limit the current drawn by the battery, with $L_{filter}$ connected in series with the positive terminal of the battery stack via the DC/DC switch 38, the charge/discharge switch 35, and $C_{filter}$ connected to the voltage input of the DC/DC converter. $C_{filter}$ provides a capacitative connection between the positive DC/DC terminal and DC/DC ground terminal in order to smooth the DC/DC input ripple current. When the PWM is in the OFF state (current is 0), $C_{filter}$ is charged by $L_{filter}$, and $C_{pool}$ is charged by the battery. $C_{filter}$ is charged from the inductor current, which continues due to the stored magnetic field. When the PWM ON state signal is provided, $C_{pool}$, which is in parallel with the battery, is discharged by the inductor $L_{filter}$. $C_{filter}$ discharges into the DC/DC converter and $L_{filter}$ creates a magnetic field. This activity acts to limit current ripple from the battery. We note that the battery internal resistance is ~100 times higher than the impedance of the capacitors, and essentially isolates $C_{pool}$ from the positive side of the battery. In preferred embodiments of the invention, a positive terminal connector configured to accept a positive terminal of a battery is in electrical connection with the positive input of said DC/DC voltage converter via the converter's DC/DC input switch and the low-pass filter.

It is important to understand that the VPSU is not simply a DC/DC converter; it is a system that converts the motor controller PWM frequency, typically 5-30 kHz, to a frequency of 350-500 kHz, the internal operating frequency of the DC/DC converter, which incidentally is also a PWM signal. In the VPSU, the batteries no longer experience the PWM of the motor, but rather only the order of magnitude higher PWM frequency of the DC/DC converter, which enables the use of much smaller coils and capacitors than are used in EV battery systems known in the art. Because each individual VPSU is relatively small, and uses relatively small capacitors and inductor, the voltage does not reach high values, and the coils do not saturate due the motor high current.

B. Bidirectional Short-Circuit Protected Multipole Switch (BDPS)

Reference is now made to FIG. 3, which presents a schematic diagram of one non-limiting embodiment 1100 of a BDPS. The BDPS is designed to enable high-efficiency use of the batteries in the system. In addition to serving as the switch for the battery system voltage output, in preferred embodiments of the invention, the system operational mode is set by a BDPS. Each BDPS is a multipole, single-throw negative blocking current, transistor. The BDPS separates a command level and a switching level. The two levels are separated by charge pump 95 for a low voltage system (typically 100 V or less), shunt 100, and high-side shunt amplifier 101. The high-side shunt amplifier has a wide common mode signal range. N gate drivers 96 (N≥1) accept command level signals, and each gate driver generates switching level signals in order to drive one of N transistor gates 99. In the non-limiting embodiment illustrated in FIG. 3, N=3. If fully galvanic separation is needed, then the charge pump comprises a transformer and the current sense is done by an isolated amplifier or magnetic current sensor. The charge pump is operated with high-speed oscillator circuitry to generate a VGS voltage of >10 V. The current for the charge pump is low, typically about 20 μA; due to the high speed of the oscillator, the time from the issuing of the command to the VGS generation by the gate driver is less than 5 μs.

When ON(n) command is asserted 92, the charge pump starts to operate immediately, but a low-pass filter 94 delays the signal for about 5 μs. After this delay, the ON(n) signal propagates to the gate driver to open transistor n on the normally open (N.O.) side of the BDPS. When one of the gate drivers 96 is asserted, a diode connected as a common cathode 97 opens the gate of transistor 98 located on the common side of the BDPS. This single transistor TR1 on the common side reduces the number of components and increases the reliability of the BDPS relative to semiconductor switches known in the art. The current is measured at shunt resistor 100. A high-speed common mode high side amplifier 101 sends the current to the MCU 41 of the VPSU for control and management. If a short circuit were to occur, increasing the current above a preprogrammed level, then a comparator triggers a memory element flipflop, shutting down transistor n. Even if transistor n is shut down, the remaining N.O. transistors can continue to operate normally.

As an example of the efficiency of the BDPS, a typical commercially available transistor (e.g. ON-Semiconductor Corporation model NTMTS0D7N06CLTXG) has a drain to source resistance of 680 μΩ. The BDPS comprises two connected transistors and a 1 mΩ shunt resistor for a total resistance of 2.36 mΩ. In a typical embodiment of the invention, the VPSU comprises two BDPSs for two stacks, each of which comprises 10 batteries. If each battery has an internal resistance of 45 mΩ, then the total connection efficiency of the BDPS is $$99\% \left(= 1 - \frac{2.36}{45\left(\frac{10}{2}\right)}\right).$$

C. Discharge Mode

The VPSU has two operational modes, "discharge" and "charge." The discharge mode is the normal state when the batteries are in use, e.g. while the EV is moving under battery power. The MCU dynamically sets the output voltage of the DC/DC converter according to the current needs of the output device (e.g. the motor controller of the electric motor). For example, in an exemplary non-limiting embodiment in which the battery stack comprises ten 3.7 V batteries, the output voltage from the DC/DC converter can be set at any value from 25 and 50 volts. The simultaneous use of multiple VPSUs will be described in detail below. One main advantage of the use of the MCU and DC/DC converter to set the output voltage dynamically in a linear mode is that by raising or lowering the output voltage as needed, the PWM duty cycle to the motor winding can be kept close to 50%, thereby achieving optimal DC/DC efficiency and lowering high harmonics produced by the motor driver and therefore reducing RFI/EMI interference and lowering or the eliminating ripple current.

In discharge mode, the MCU (41) obtains an instruction to set the voltage from the motor controller or the EV's main processor. From this instruction, the MCU changes the voltage set point 46 of the DC/DC converter. The MCU can also send a "shut down" (SD) signal to the DC/DC converter as necessary. In some embodiments of the invention, other signals are sent by the MCU to the DC/DC converter, depending on the details of the construction of the converter. Concurrently with the setting of the DC/DC converter voltage set point, MCU switch control 48 sets the VPSU switches in order to maintain the correct total battery arrangement. MCU analog input 40 reads analog signals in the VPSU, for example, the battery current as determined by battery current sensor 36. The current from the DC/DC converter is measured by a converter current sensor 44 that in typical embodiments is constructed similarly to the battery current sensor. The MCU comprises means for measuring the battery parameters such as voltage and temperature. This data is collected by the MCU and transmitted to the motor controller and/or EV main processor via the MCU—processor data connection described above in order to manage the power and keep the PWM signals close to a 50% duty cycle.

In embodiments of the invention in which the VPSU comprises a BMS, the BMS system 32 communicates the battery status to the MCU, and in some embodiments, to the motor controller and/or EV main processor as well.

D. Charge Mode

When the batteries are being charged, the VPSU is placed in the charge mode. Under typical conditions of use, the VPSU will be placed in the charging state approximately daily. The system is connected to an external source of electricity in order to recharge the batteries. In principle, the batteries can be charged while remaining in serial connection. This method requires a high-voltage charger and consequently can be hazardous.

One advantage of the VPSU architecture is that it permits a low-voltage charge mode, in which the battery charging is performed via the VPSU DC/DC converter. In such an arrangement, the VPSU DC/DC converter controls the charging of the local VPSU batteries. This mode thereby enables the use of an external low voltage power source which, in preferred embodiments, supplies a voltage of ≤50 V, for battery recharging. In low voltage charging mode, the charging process is controlled by the VPSU rather than by an external charger. In this mode, the voltage adjust set of the MCU sets the voltage necessary to charge the batteries connected to the VPSU, while the SD signal controls the power output bridge of the DC/DC converter to establish a dynamic current loop. This current loop is based on the current measurement, voltage adjust, battery temperature monitoring, and the DC/DC bridge output on-off sequence. The requirement that the MCU be able to perform all of these functions in tandem determines the limit, described above, that the MCU must have computing power sufficient to allow a dynamic charge current loop with a frequency of >100 kHz.

The control of the charging process by the VPSU can be thought of in terms of a parameter $\alpha=\Delta V/\Delta I$ where V and I are the charge voltage and current, respectively. The VPSU topology then allows measurement of and response to the battery's "ionization factor" $\Delta\alpha/\Delta T$, where T is the battery temperature. This parameter is called the battery's ionization factor because the temperature rises after the battery ionization has reached its maximum value. This ionization factor is used as an input to a linear feedback loop in order to mitigate the temperature rise during the charging process, thereby improving the performance and extending the lifetime of the batteries; see, for example, Ma, S.; Jiang, M.; Tao, P.; Song, C.; Wu, J.; Wang, J.; Deng, T.; Shang, W. "Temperature Effect and Thermal Impact in Lithium-Ion Batteries: a Review," *Prog. Nat. Sci.-Mater.* 2018, 28, 653.

E. Multiple VPSUs

Figure 4C:
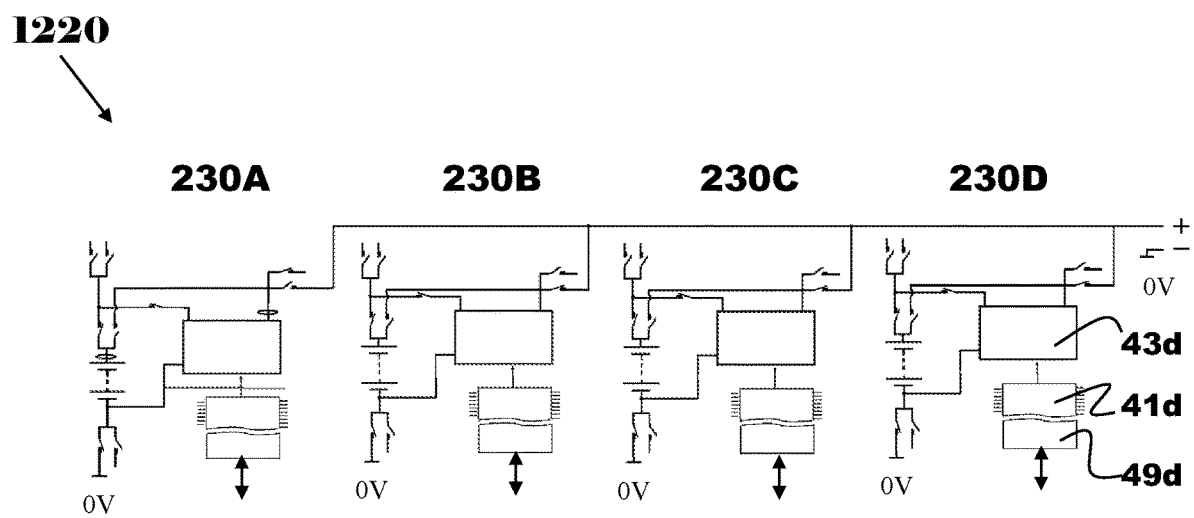
FIGS. 4A 4B, and 4C are schematic diagrams of three non-limiting embodiments of the invention in which multiple Versatile Power Stack Units are connected.
Figure 4A:
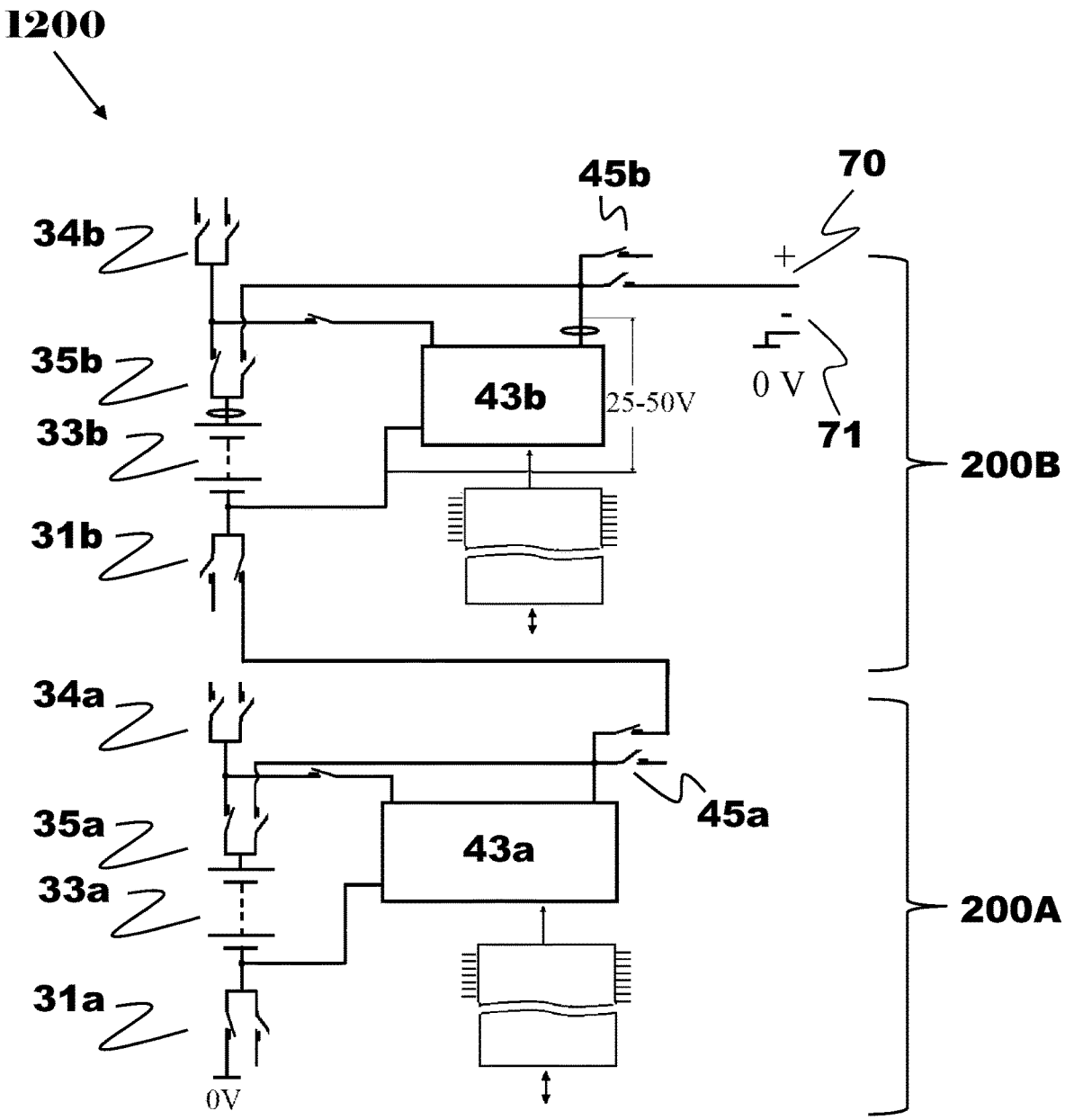

Another advantage of the VPSU is that multiple VPSUs can be combined in a single apparatus. Reference is now made to FIG. 4A, which illustrates schematically a non-limiting embodiment 1200 of the invention in which two VPSUs (lower VPSU 200A and upper VPSU 200B) are connected to form a "stack." The lower column switch 31a of the lower VPSU is connected to the 0 V (power ground) signal. The charge/discharge switch 35a of the lower VPSU and the DC/DC switch 38a switchably connect the battery stack to the positive (+) power input of the DC/DC converter 43a of the lower VPSU. The negative (−) power input of the DC/DC converter of the lower VPSU is continuously connected to the battery stack 33a. The upper column switch 34a of the lower VPSU is disconnected, and the voltage output switch 45a of the DC/DC converter of the lower VPSU is connected to the lower column switch 31b of the upper VPSU. The charge/discharge switch 35b and DC/DC switch 38b of the upper VPSU switchably connect the battery stack 33b attached to the DC/DC converter 43b of the upper VPSU, while the negative power input of the DC/DC converter of the upper VPSU is continuously connected to the battery stack connected to the upper VPSU. The voltage out switch 45b of the DC/DC converter of the upper VPSU is switchably connected to positive terminal 70 of the motor controller, while negative terminal 71 of the motor controller is connected to ground.

While the above example describes an embodiment in which two VPSU units are connected, one of ordinary skill in the art will readily understand that any number of additional units can be connected in an analogous manner.

Figure 4B:
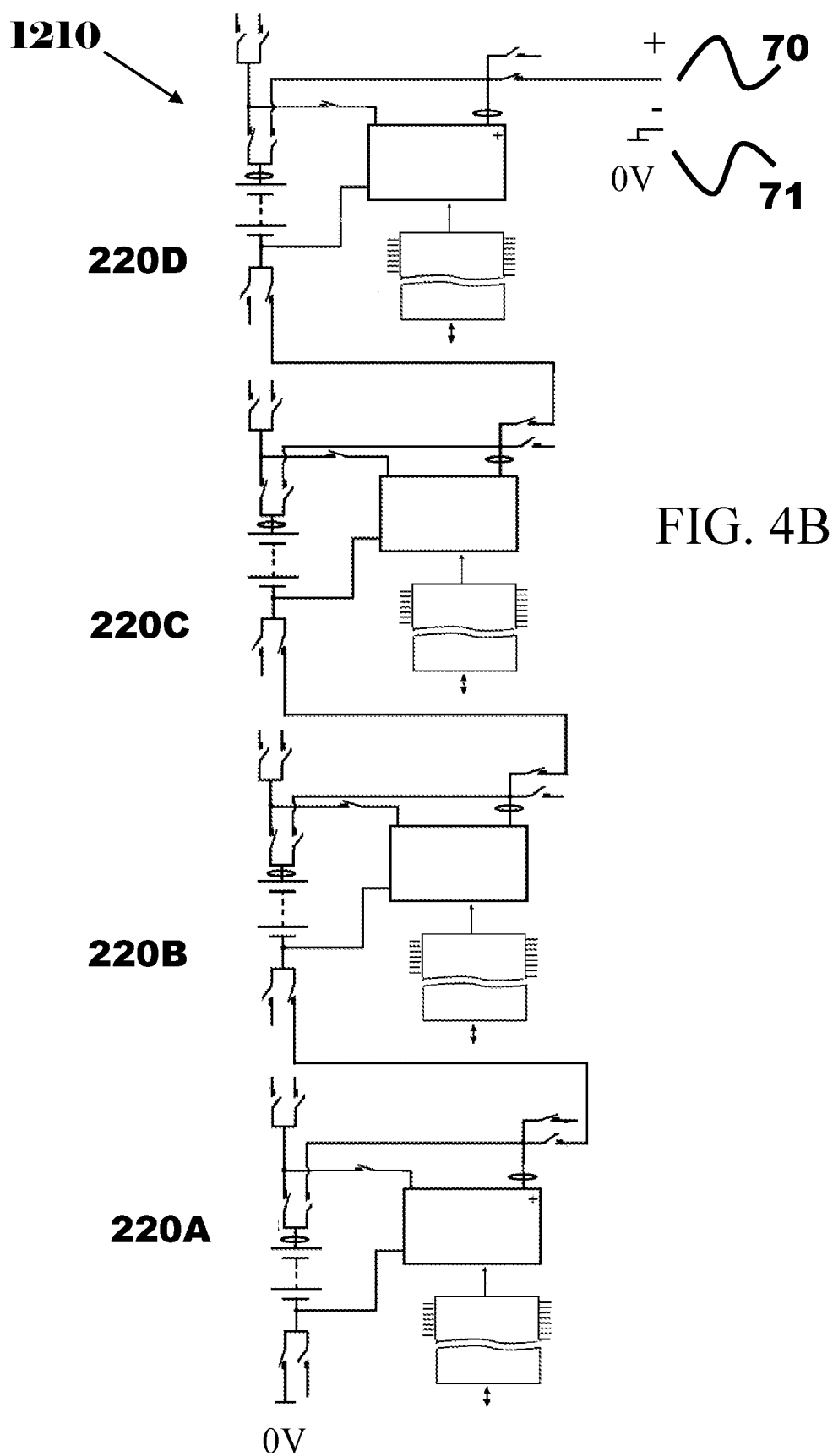

If $V_0$ to $V_{max}$ represents the output voltage range of a particular VPSU, then the voltage range for n VPSU units connected as described above will be $V_0$ to $\Sigma_n V_{max}$. As a non-limiting example, for a VPSU comprising the DC/DC converters described above and connected to ten 3.7 V batteries connected in series, the output voltage range will be 25-50 V, a stack of four such VPSU units (220A-D), as shown in the non-limiting embodiment 1210 illustrated in FIG. 4B, can generate linear voltage over the entire range of 25-200 V, etc. As was explained above, for electric motors, when the speed of the motor increases, the back EMF, which generates voltage opposing the motor driver voltage, increases. thereby reducing the torque. The wide linear voltage range made possible by the multiple VPSU arrangement allows the motor controller to increase the applied voltage when the motor speed is increased. In many cases, this large voltage range can eliminate any need for mechanical gear to provide the torque needs of the motor.

When the torque required from the electric motor is high, a combination of multiple VPSUs can be connected in parallel in order to enable high current output. Reference is now made to FIG. 4C, which illustrates a non-limiting embodiment 1220 in which multiple (four in this case) VPSUs (230A-D) are connected in parallel. Multiple VPSUs can be arranged in serial, in parallel, or in any combination thereof.

F. Charging Modes for Multiple-VPSU Systems

In contrast to systems known in the art that require 400V-600V grids and expensive devices, the VPSU arrangement allows charging over a much lower voltage range of 8-100 VDC, thereby simplifying the system and increasing its safety.

As with the case of a single VPSU, there are two charging configurations for multiple-VPSU systems, high voltage and low voltage, as well. During the charging process, the VPSUs are controlled by the EV host computer, with the motor control acting as a data communication bridge.

Figure 5:
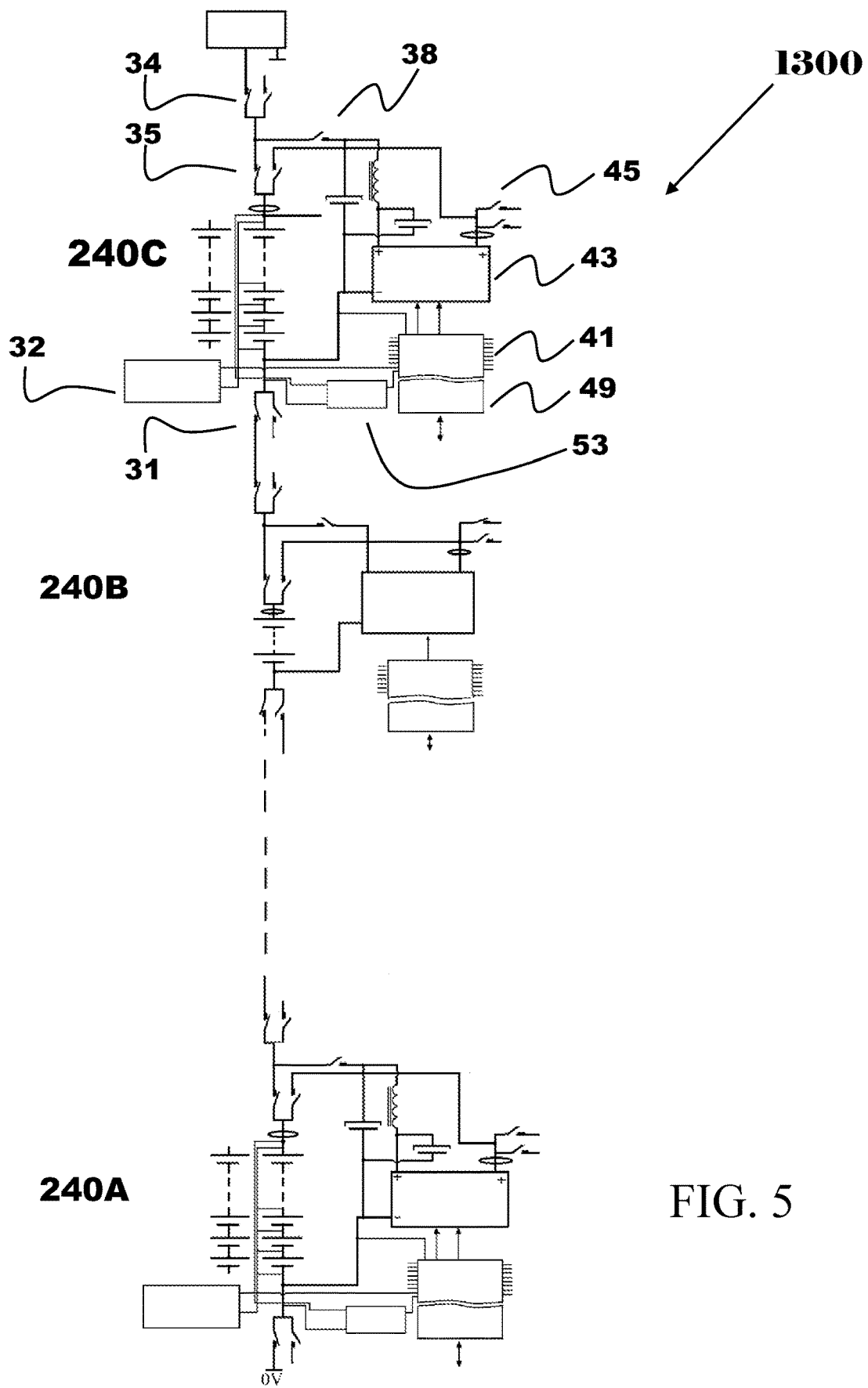
FIG. 5 is a schematic diagram of a non-limiting embodiment of a setup for high-voltage charging of a system that comprises a plurality of Versatile Power Stack Units.

In high voltage mode, the VPSUs are connected in series with the upper column switch of one VPSU connected to the lower column switch; the charging is then done according to the battery manufacturer's specifications. Reference is now made to FIG. 5, which shows schematically a typical arrangement for high-voltage charging of a non-limiting embodiment 1300 of a system comprising plurality of VPSUs (three in this case, 240A-C). The lower column switch of the first VPSU is connected to ground, while each succeeding lower column switch is connected to the upper column switch of the preceding VPSU. The upper column switch of the final VPSU is connected to an external high voltage charger. The charge/discharge switches are set to the charge position, and the DC/DC input switches are opened. In this configuration, the charge current flows from the high voltage charger to all of the batteries in series. The charging process is controlled by the charger and, in embodiments in which they are present, by the BMS of each VPSU, which acts to equalize the charge and current on the batteries.

In low voltage charge mode, the VPSUs are connected in parallel. The upper column switch of each VPSU is connected to a low voltage (≤50V) charger. In preferred embodiments of the invention, a single low voltage charger is used for the entire system. The DC/DC converter can act as a step-up converter if the input charging voltage is insufficient to charge the batteries; for typical DC/DC converters, the minimum input voltage is 8 VDC. The voltage and current output are controlled via the MCU, the DC/DC voltage being controlled by an analog output of the local microprocessor. The current is regulated by switching the DC/DC bridge with the SD signal from the MCU. In embodiments in which fast charging with a charge current above 1 C is required, the system includes means for measuring the battery temperature, the means being in data connection with the MCU, and the temperature is monitored by the MCU during the charging process; if the temperature or rate of temperature rise exceeds a predetermined limit, the charge current is reduced accordingly. As explained above for the case of charging of a single VPSU, the use of the ionization factor as input to a feedback loop enables the system to limit the temperature rise during the charging cycle, thereby improving the performance and extending the lifetime of the batteries. In addition, since each VPSU unit controls the charging of the batteries in that unit separately, in contrast to systems known in the prior art, the system disclosed herein enables separate and precise charging of small groups of batteries (i.e. each stack of batteries associated with a particular VPSU unit) rather than simultaneous and non-directed charging all of the batteries in the motor control system. In addition, the low voltage charging mode enables charging of simple, low-voltage charging of a plurality of VPSUs that comprise an entire battery pack, and can typically reach a total output voltage of 400-500 V. This capability (low-voltage charging of a high-voltage system) does not exist in battery systems known in the art.

Figure 6:
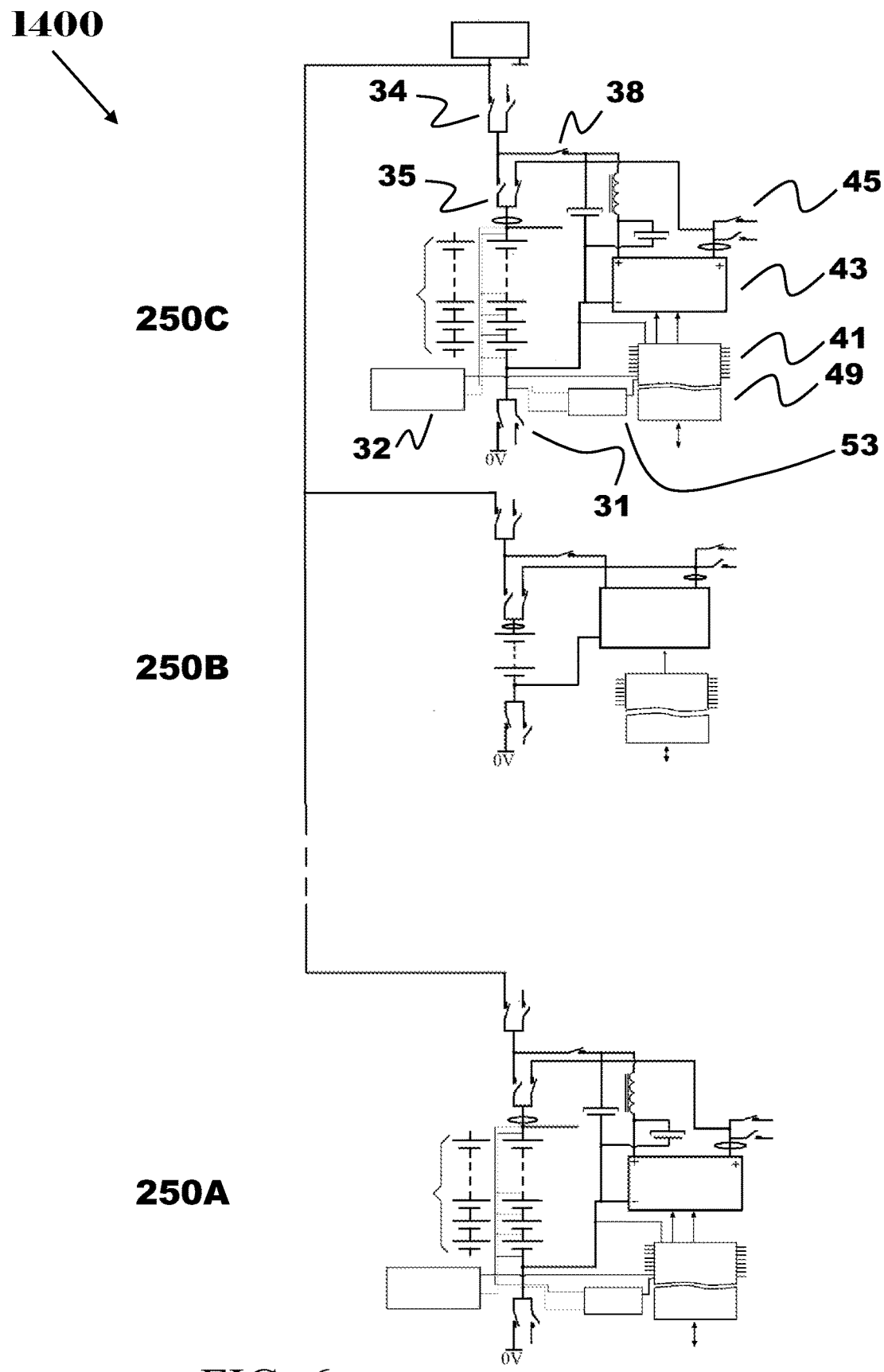
FIG. 6 is a schematic diagram of a non-limiting embodiment of a setup for low-voltage charging of a system that comprises a plurality of Versatile Power Stack Units.

Reference is now made to FIG. 6, which shows schematically a typical arrangement for low-voltage charging of a non-limiting embodiment 1400 of a system comprising plurality of VPSUs (three in this case, 250A-C). In this charging mode, the VPSUs are connected in parallel through their upper column switches. Any number of VPSUs can be charged simultaneously as long as the charger can supply the current required. If the charger cannot supply the current needed for a fast charge, then the software in the EV computer extends the charging time, and charging takes place at the maximum current output of the charger.

Figure 7:
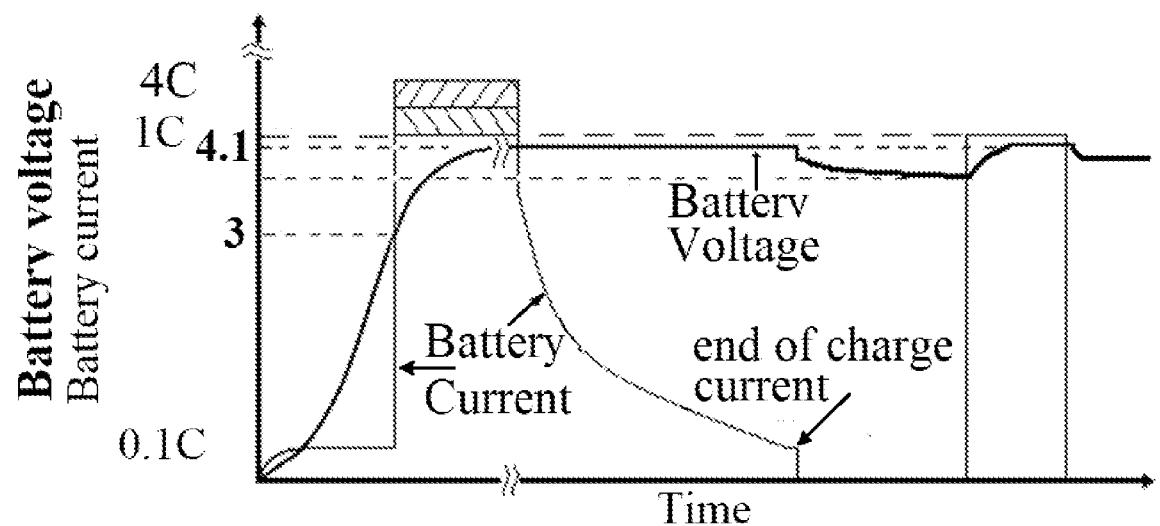
FIG. 7 is a graph illustrating schematically battery voltage and battery current as a function of time during a typical Versatile Power Stack Unit charging cycle.
Figure 9A:
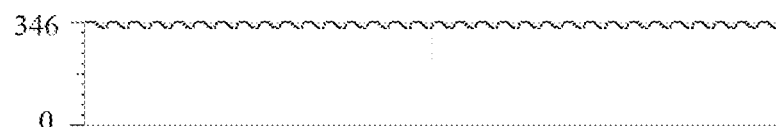
FIGS. 9A-9D present graphically the calculated battery voltage, battery power loss, battery power, and motor current, respectively, for a simulation run using the circuit shown in FIG. 8.
Figure 9B:
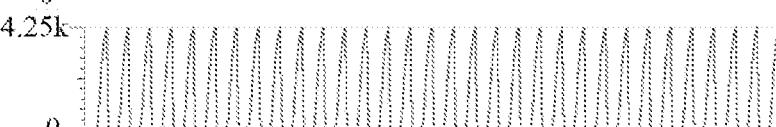
Figure 9C:
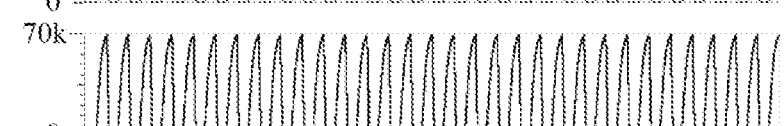
Figure 9D:
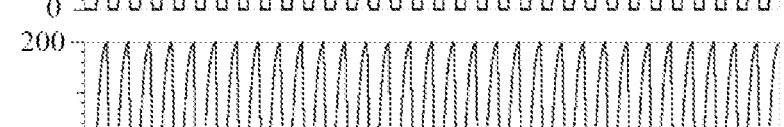

In preferred embodiments of the invention, each MCU stores the charging voltage vs. the charging current and battery cell temperatures at predetermined intervals (typically once per second). The charging parameters are stored in the MCU non-volatile memory, thereby enabling the system to determine and operate at the optimum charging voltage, current, and duration during each charge cycle. The manufacturer's recommended charging voltage (e.g. for a 3.7 V battery, the recommended charging voltage is typically 4.2 V) can be changed according to the running average of the voltage-current-temperature ratio. Reference is now made to FIG. 7, which shows a graph of battery voltage and battery current as a function of time for a typical VPSU charging cycle. The 0.1 C point is reached soon after the charge cycle begins; normally, this is far below the minimum discharge point. The VPSU slowly increases the charging voltage to the nominal charging voltage. The charging current undergoes an abrupt jump to the 1 C charging point; the charging voltage continues to increase, however.

EXAMPLES

The following non-limiting examples are presented in order to assist a person of ordinary skill in the art to make and use the invention disclosed herein, and to illustrate the advantages of the instant invention over systems known in the art. In the examples that follow, the circuit diagrams presented are of emulations that accurately replicate the behavior of real systems. Unless otherwise stated, in the emulations, in order to simplify the calculations, the batteries are treated as having no internal resistance, and the internal resistance of the batteries is emulated by a single resistor having the same resistance as the total internal resistance of the batteries. The behavior of the circuits under realistic conditions is simulated by using the commercially available TINA Spice simulation ver. 11 software (Design-Soft).

Example 1

Figure 8:
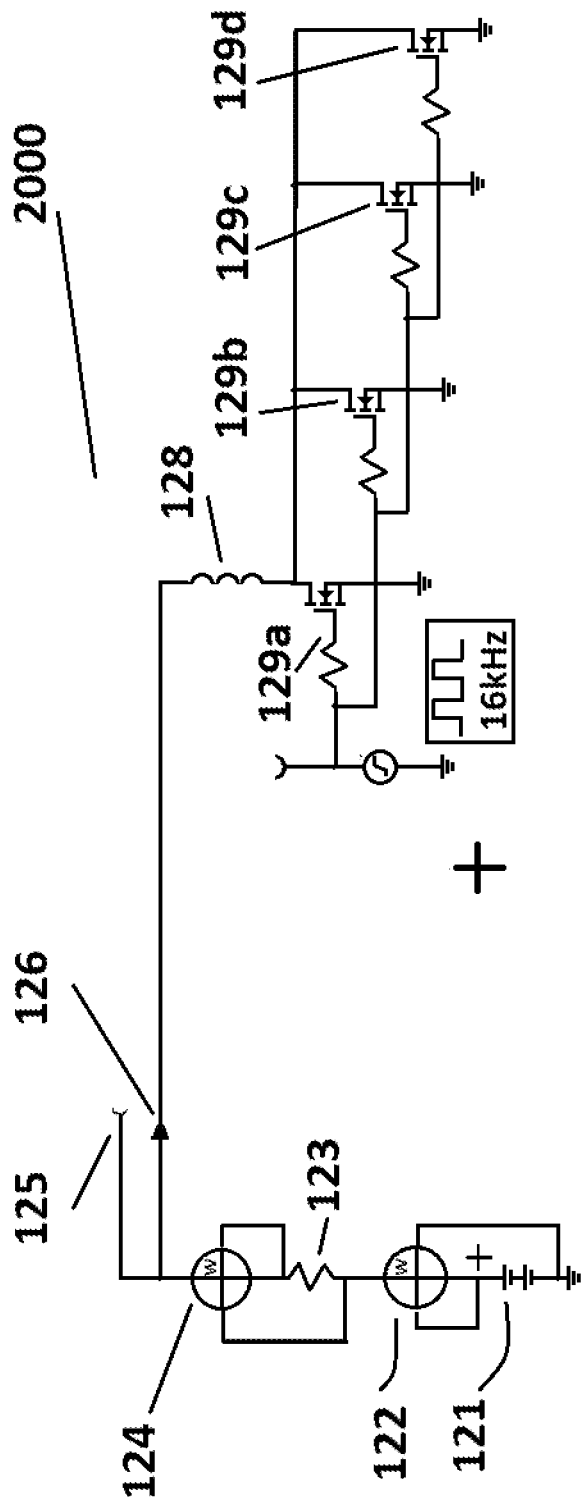
FIG. 8 is a schematic diagram of a circuit that emulates systems known in the prior art for driving the motor of an electric vehicle (70 KWh)

As an illustration of the problems of approaches known in the art, and of battery losses under typical conditions, a simulation was run on a circuit that emulates a battery system of an EV. Reference is now made to FIG. 8, which presents a circuit diagram for a circuit 2000 that emulates a battery system similar to that of a commercially available TESLA model 3 EV. The circuit includes voltage source 121 with a nominal voltage of 345.6 V and a nominal internal resistance of zero; the internal resistance of the battery is emulated by an external resistor 123 with resistance 108 mΩ. Meters 122 and 124 indicate the points in the circuit in which the simulated power at the battery output and after the resistor (i.e. taking into account losses due to internal resistance), are determined, respectively. The simulated battery output current and voltage are determined at the points indicated as current meter 126 and voltmeter 125, respectively. The load is simulated with an inductor 128 that has an inductance of 30 pH and a serial resistance of 20 mΩ. Oscillator 127 generates a 16 kHz signal at 50% PWM. Four MOSFET transistors 129a-d, connected in parallel, carry the current through the inductor. This emulation is expected to provide a realistic simulation of the waveforms observed in an actual EV system, since the electric motor usually behaves as an inductive load with a wiring resistance loss.

Reference is now made to FIGS. 9A-9D, which show graphically the calculated battery voltage (V), battery power loss (W), battery power (W), and motor current (A), respectively, as a function of time for a simulation run using circuit shown in FIG. 10. The results of this simulation clearly show the power losses in the battery. The results presented in FIG. 9 show that for a battery voltage of 337.43 V (FIG. 9A), the average power drawn from the battery (FIG. 9C) at a 50% PWM duty cycle is 26.47 kW (37.92 kW RMS). The power loss in the battery (FIG. 9B) averages 1.3 kW (2.04 kW RMS), i.e. under these conditions, 7.7% of the battery power expended is lost as heat; note that while the battery power from the motor controller perspective is calculated from the average value, the battery losses due to internal resistance are calculated as RMS.

Example 2

Reference is now made to FIG. 10, which presents a schematic diagram of a second circuit 2100 that emulates low voltage prior art EV battery systems, the EV battery pack drives an inductive load such as a motor coil winding of an electric vehicle. The system presented in this example is analogous to the one depicted in FIG. 8, and comprises 20 batteries 151 divided into two stacks of 10 batteries. Within each stack the batteries are connected in series, and the two stacks are connected in parallel. Each battery in the circuit is a simulation of a Panasonic NCR 18650B lithium ion battery having a nominal voltage of 3.7 V and an internal resistance of 45 mΩ. The total internal resistance is represented by 225 mΩ resistor 153. The arrangement of the batteries shown in FIG. 10 provides a nominal 1 C current of 6.5 A. The simulated battery power is determined at the point indicated by meter 152, and the power loss at the point indicated by meter 154. Signal generator 155 produces a 16 kHz signal that drives transistor 156. The current flows through inductor 157, which in the non-limiting example of the circuit shown in FIG. 10 has an inductance of 85 µH, and the output current and voltage are determined continuously at the points indicated by sensors 158 and 159, respectively.

Reference is now made to FIGS. 11A-11D, which present graphically time-dependent battery voltage (V), battery power loss (W), battery power (W), and battery current (A), respectively, during a simulation run using the circuit shown schematically in FIG. 10. The peak current load is 14.83 A. During each cycle, the total battery voltage drops from 37 V to 33.66 V. The average battery power is 174.97 W, the motor behaving as a low pass filter, and the RMS power loss is 17.69 W. Thus, the power loss in this system is 10.1%.

Example 3

Figure 12:
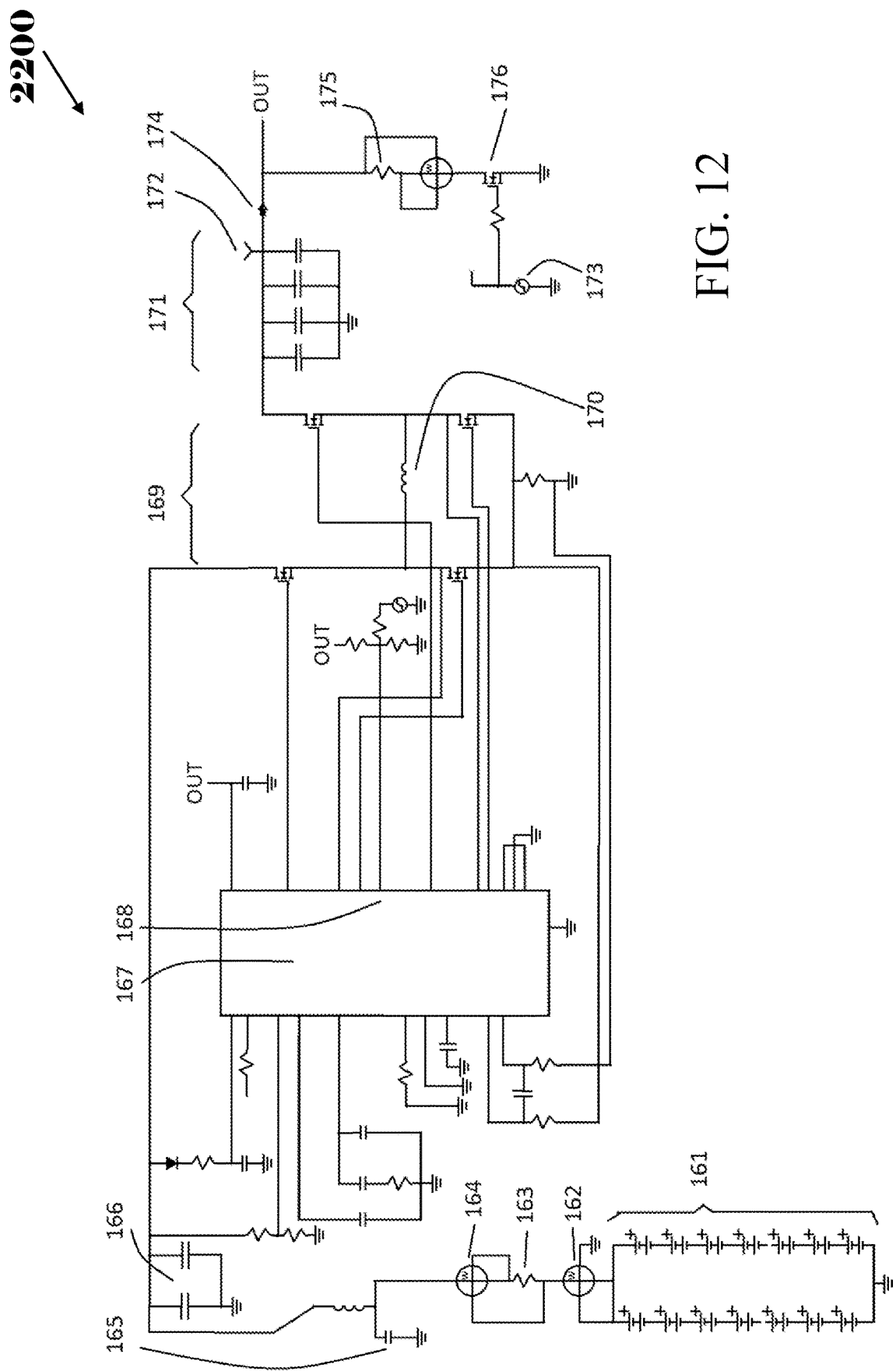
FIG. 12 a schematic diagram of a circuit that emulates the DC/DC Buck-Boost converter and capacitor C3 and inductor L3 of the energy storage section of the VPSU.

Reference is now made to FIG. 12, which presents a schematic diagram of a third circuit 2200 that emulates the DC/DC portion of the VPSU disclosed herein. In this simulated circuit, the 3.7 V batteries 161 are arranged in two parallel stacks of 10 batteries each, with the internal resistance of the batteries represented by resistor 163. The nominal voltage is 37 V and the nominal 1 C current is 6.5 A. Power meter 162 measures the output of the batteries, while power meter 164 measures the power losses due to internal resistance. A low pass filter 165 at the batteries and a bulk capacitor 166 simulate the path between the DC/DC converter and the batteries. The DC/DC converter 167 is controlled by the FB voltage level pin 168 and the current limits. The FB, CS, and CS0 pins of the MCU control the output voltage and the maximum current of transistor bridge 169. The DC/DC converter is a buck-boost converter with a single inductor 170; the quality of the inductor, particularly the winding resistance and bridge transistor loss from switching and RDS losses, is crucial for maximization of the total system efficiency. The output capacitors 171 smooth and filter the DC output voltage. The output voltage is determined at the point indicated by voltmeter 172, and the current output at the point indicated by current meter 174.

The load, represented by 2.64Ω resistor 175, has sharp rise and fall times and is quite close to actual motor loads. A signal generator 173 drives the current through the 2.64 resistor via power MOSFET transistor 176.

Reference is now made to FIGS. 13A-13G, which present graphically the calculated time-dependent load voltage (V), load current (A), load power (W), battery loss (V), battery power (W), battery voltage (V), and battery current (A), respectively, during a simulation run using the circuit depicted in FIG. 12. The graphs show the values of these parameters over 0.5 ms, starting 1 ms after the beginning of the simulation, after the initial transients have died down. The load current (FIG. 13B) is the same as that shown in FIG. 5C for the simulation run on an emulator of a system known in the prior art. In contrast to systems known in the art, however, the voltage output (FIG. 13A) is stable at a constant 37 V. The battery voltage and current (FIGS. 13F and 13G, respectively) likewise are stable, with no ripple voltage or current. The battery power (FIG. 13E) is 257.98 W, the battery power loss (FIG. 13D) is 10.96 W, i.e. only 4.24% is lost as heat, a significant improvement over systems known in the art.

Example 4

Figure 14:
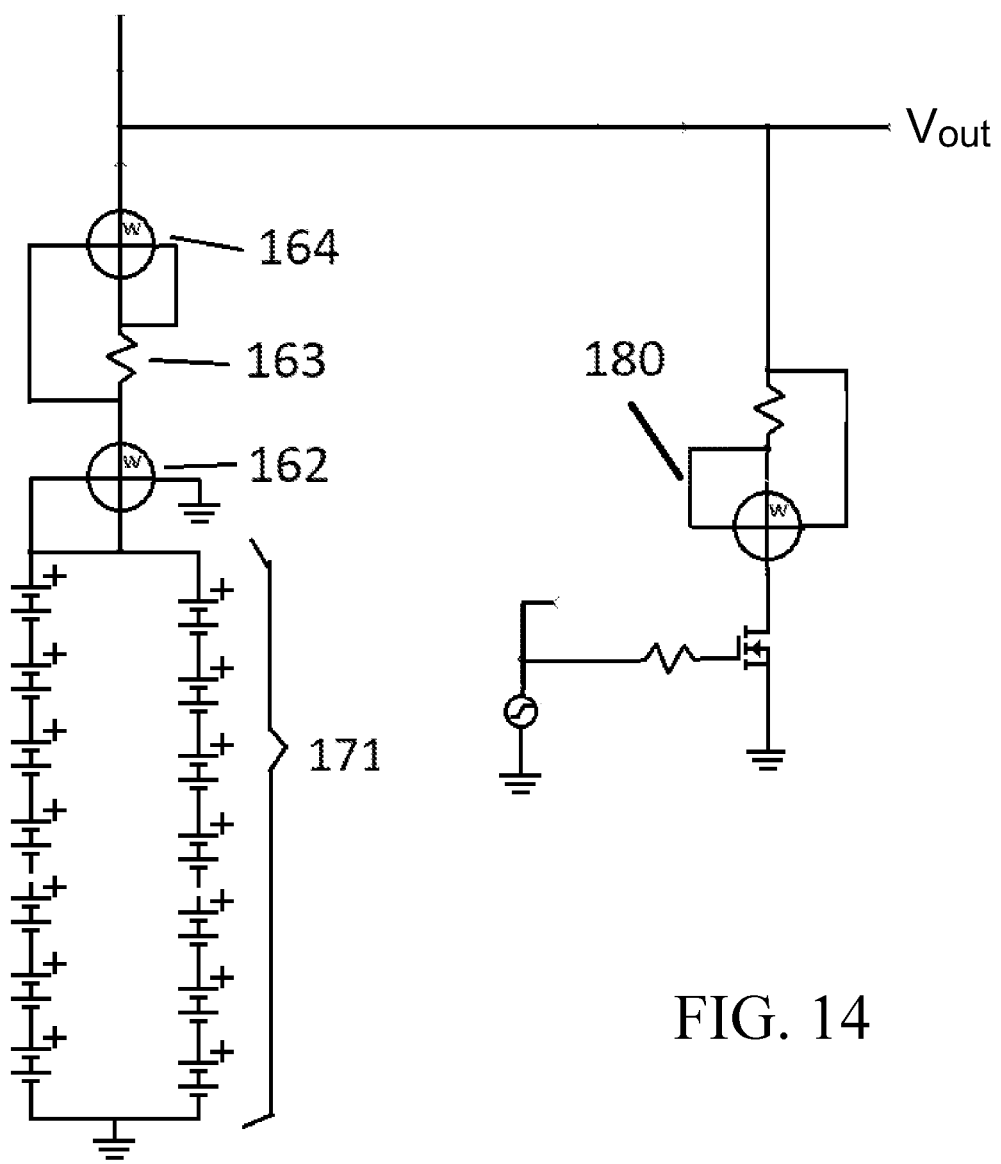
FIG. 14 presents a schematic diagram of a circuit identical to that of FIG. 12 without the DC/DC booster and output capacitors; and, FIGS. 15A-15G present graphically the load voltage, load current, load power, battery loss, battery power, battery voltage, and battery current, respectively, for a simulation run using the circuit shown in FIG. 14.

Reference is now made to FIG. 14, which is a schematic diagram 2300 emulating a system known in the art, but without the ripple capacitor.

In the simulations, the load, represented by a 2.64Ω resistor 180, shows a sharp rise and fall time and is quite close to actual motor loads. A signal generator drives the current through the 2.64Ω resistor via power MOSFET transistor.

Reference is now made to FIGS. 15A-15G, which present graphically the time-dependent load voltage (V), load current (A), load power (W), battery loss (W), battery power (W), battery voltage (V), and battery current (A), respectively, during a simulation run using the circuit depicted in FIG. 14. The graphs show the values of these parameters over 0.5 ms, starting 1 ms after the beginning of the simulation, after the initial transients have died down. the simulation run on an emulator of a system known in the prior art. the voltage output (FIG. 15A) is not stable at a constant 37 V. The battery voltage and current (FIGS. 15F and 15G, respectively) are not stable, but rather demonstrate significant ripple voltage and current. The battery power (FIG. 15E) is 239.13 W, the battery power loss (FIG. 15D) 26.51 W RMS, i.e. 11% is lost as heat, a significant loss in comparison to the instant invention.

I claim:
1. A system for controlling an electrical device, said system comprising a versatile power stack unit (VPSU), said VPSU comprising:
   a lower column switch (31);
   an upper column switch (34);
   a charge/discharge switch (35);
   a voltage output switch (45) configured to provide an electrical connection between said VPSU and said electrical device;
   a battery pack (33) comprising at least one battery stack, each battery stack comprising a plurality of batteries connected in series;
   a DC/DC input switch (38);
   a Micro-Controller Unit (MCU) (41);
   a galvanically isolated interface (49);
   electric storage elements arranged as an CLC low-pass filter (420);
   a DC/DC voltage converter (43) comprising a negative input, a positive input, and a DC/DC variable positive voltage output;
   a negative terminal connector in electrical connection with said negative input of said DC/DC voltage converter and configured to accept a negative terminal of a battery; and,
   a positive terminal connector configured to accept a positive terminal of a battery;
wherein:
   said lower column switch is a multiple-throw switch that when connected in a first configuration (311) provides an electrical connection between said negative terminal connector and ground, and when connected in a second configuration (312) provides an electrical connection between said negative terminal connector and a connection configured to provide a first electrical connection to a device external to said system;
   said upper column switch is disposed in series between said charge/discharge switch and said connection configured to be connected to an external source of electricity;
   said positive terminal connector is in electrical connection with said positive input of said DC/DC voltage converter via said DC/DC input switch and said low-pass filter;
   said battery pack is connected to said lower column switch and to said upper column switch via said charge/discharge switch;
   said MCU:
      is characterized by sufficient computing power to allow a dynamic charge current loop >100 kHz;
      comprises a switch control configured to set switches in said system;
      is in data connection with said DC/DC voltage converter and is configured to send control signals to said DC/DC voltage converter; and,
      is configured to be in data connection with at least one external controller via said galvanically isolated interface; and,
   said charge/discharge switch is a multiple-throw switch that when connected in a first configuration (351) provides an electrical connection between said positive terminal connector and a terminal of said DC/DC voltage output, and when connected in a second configuration (352) provides an electrical connection between said positive terminal connector and a connection configured to be connected to an external source of electricity.

2. The system according to claim 1, wherein said DC/DC voltage converter is a buck-boost converter.

3. The system according to claim 1, wherein said system comprises a battery management system (32) configured to monitor each cell of said battery and control to current and voltage on each cell of said battery.

4. The system according to claim 1, wherein said system comprises measuring means for measuring at least one parameter selected from the group consisting of battery voltage, battery current, battery temperature, voltage output, and current output.

5. The system according to claim 1, wherein said electrical device comprises at least one electric motor.

6. The system according to claim 5, wherein said system comprises at least one motor drive controller configured to maintain a pulse-width modulated (PWM) output signal.

7. The system according to claim 1, wherein at least one of said switches comprises:
n inputs (92), n≥1;
n low-pass filters (94), each low-pass filter having an entrance and an exit, each of said entrances connected in series with one of said n inputs;
a charge pump (95) in electrical connection with said exit of each of said low-pass filters, said charge pump comprising oscillator circuitry sufficient to generate a VGS voltage >10V;
n gate drivers (96), each in electrical connection with said exit of one of said low-pass filters;
n diodes (97) connected as a common cathode;
a transistor (98) on a common side of said switch, configured such that when at least one of said gate drivers is asserted, said diodes open a gate of said transistor;
n normally open transistors (99), each of which is in electrical connection with one of said gate drivers and said transistor (98);
a shunt resistor (100) in series with said common transistor;
an amplifier (101) configured to transmit current that has passed through said shunt resistor; and,
a comparator (103) configured to trigger a shutdown of any of said normally-open transistors if a short circuit increases current through said switch above a predetermined level.

8. The system according to claim 1, wherein said voltage out switch is a multiple-throw switch that when connected in a first configuration (451) provides an electrical connection between said DC/DC variable positive voltage output and an external load and when connected in a second configuration (452) provides an electrical connection between said DC/DC variable positive voltage output and a connection configured to provide a second electrical connection to a device external to said system.

9. A system for controlling an electric device, said system comprising a plurality of n versatile power stack units (VPSUs), each VPSU comprising:
a lower column switch (31n);
an upper column switch (34n);
a charge/discharge switch (35n);
a voltage output switch (45n) configured to provide an electrical connection between said VPSU and said electrical device;

a battery pack (33n) comprising at least one battery stack, each battery stack comprising a plurality of batteries connected in series;
a DC/DC input switch (38n);
a Micro-Controller Unit (MCU) (41n);
a galvanically isolated interface (49n);
electric storage elements arranged as a CLC low-pass filter (420n);
a DC/DC voltage converter (43n) comprising a negative input, a positive input, and a DC/DC variable positive voltage output;
a negative terminal connector in electrical connection with said negative input of said DC/DC voltage converter and configured to accept a negative terminal of a battery; and,
a positive terminal connector configured to accept a positive terminal of a battery;
wherein:
each of said lower column switches (31n) provides a switchable electrical connection (311n) between said negative terminal connector of said VPSU n and ground;
each of said lower column switches (31n) is a multiple-throw switch that when connected in a first configuration (311n) provides an electrical connection between said negative terminal connector of said VPSU n and ground, and when connected in a second configuration (312n) provides an electrical connection between said negative terminal connector of said VPSU n and a connection configured to provide a first electrical connection to a device external to said system;
each of said upper column switches (34n) is disposed in series between said charge/discharge switch of said VPSU n and said connection configured to be connected to an external source of electricity;
each of said battery packs (33n) is connected to said lower column switch of VPSU n (31n) and to said upper column switch of VPSU n (34n) via said charge/discharge switch of said VPSU n (35n);
said positive terminal connector of said VPSU n in electrical connection with said positive input of said DC/DC voltage converter of said VPSU n (43n) via said DC/DC input switch of said VPSU n and said low-pass filter of said VPSU n (420n);
each of said MCUs (41n):
is characterized by sufficient computing power to allow a dynamic charge current loop >100 kHz;
comprises a switch control configured to set switches in said system;
is in data connection with said DC/DC voltage converter and is configured to send control signals to said DC/DC voltage converter; and,
is configured to be in data connection with at least one external controller via said galvanically isolated interface; and,
each of said charge/discharge switches (35n) is a multiple-throw switch that when connected in a first configuration (351n) provides an electrical connection between said positive terminal connector and a terminal of said DC/DC voltage output, and when connected in a second configuration (352n):
for VPSU n, provides an electrical connection between said positive terminal connector and a connection configured to be connected to an external source of electricity;
for each VPSU m, m<n, provides an electrical connection with said lower column switch of VPSU m+1.

10. The system according to claim 9, wherein at least one of said switches comprises:
n inputs (92n), n≥1;
n low-pass filters (94n), each low-pass filter having an entrance and an exit, each of said entrances connected in series with one of said n inputs;
a charge pump (95n) in electrical connection with said exit of each of said low-pass filters, said charge pump comprising oscillator circuitry sufficient to generate a VGS voltage >10V;
n gate drivers (96n), each in electrical connection with said exit of one of said low-pass filters;
n diodes (97n) connected as a common cathode;
a transistor (98) on a common side of said switch, configured such that when at least one of said gate drivers is asserted, said diodes open a gate of said transistor;
n normally open transistors (99n), each of which is in electrical connection with one of said gate drivers and said common transistor;
a shunt resistor (100) in series with said common transistor;
an amplifier (101) configured to transmit current that has passed through said shunt resistor; and,
a comparator (103) configured to trigger a shutdown of any of said normally-open transistors if a short circuit increases current through said switch above a predetermined level.

11. The system according to claim 9, wherein at least one of said DC/DC voltage converters is a buck-boost converter.

12. The system according to claim 9, wherein at least one of said n VPSUs comprises a battery management system (32n) configured to monitor each cell of said battery and to control current and voltage on each cell of said battery.

13. The system according to claim 9, further comprising measuring means for measuring at least one parameter selected from the group consisting of battery voltage, battery current, battery temperature, voltage output, current output.

14. The system according to claim 9, wherein said electrical device comprises at least one electric motor.

15. The system according to claim 14, wherein said system comprises at least one motor drive controller configured to maintain a pulse-width modulated (PWM) output signal.

16. The system according to claim 9, wherein:
at least one of said lower column switches is a multiple-throw switch that when connected in a first configuration (311) provides an electrical connection between said negative terminal connector and ground, and when connected in a second configuration (312) provides an electrical connection between said negative terminal connector and a connection configured to provide a first electrical connection to a device external to said system;
at least one of said n VPSUs comprises an upper column switch (34n) disposed in series between said charge/discharge switch and said connection configured to be connected to an external source of electricity; and,
said voltage out switch is a multiple-throw switch that when connected in a first configuration (451) provides an electrical connection between said DC/DC variable positive voltage output and an external load and when connected in a second configuration (452) provides an electrical connection between said DC/DC variable positive voltage output and a connection configured to provide a second electrical connection to a device external to said system.

17. The system according to claim 9, wherein:
said plurality of VPSUs is divided into plurality of groups, each of which contains at least one VPSU; and,
one of the following conditions is met:
within each group that contains more than one VPSU, said VPSUs within that group are connected one to another in series and said groups are connected one to another in parallel; and,
within each group that contains more than one VPSU, said VPSUs within that group are connected one to another in parallel and said groups are connected one to another in series.

18. A method for low-voltage charging of a plurality of batteries, wherein said method comprises:
obtaining a system comprising a plurality of VPSU units according to claim 9;
for each of said VPSU units:
obtaining a plurality of batteries;
connecting said batteries into at least one stack, wherein within each stack, said batteries are connected in series;
if said plurality of batteries comprises more than one stack, connecting said stacks of batteries in parallel; and,
connecting said plurality of batteries between, and in series with said lower column switch (31n) and said charge/discharge switch (35n);
connecting said plurality of VPSU units in parallel via their upper column switches (34n);
connecting one of said VPSU units to a battery charger via its upper column switch (34);
using said battery charger to charge said batteries at a charge current and charge voltage until said batteries are charged;
for each VPSU unit, independently controlling voltage and current output by an analog output of said MCU of said VPSU unit; and,
for each VPSU unit, regulating current by switching a DC/DC bridge of said DC/DC converter with an SD signal of said MCU.

19. The method according to claim 18, wherein:
each of said VPSU units comprises temperature measuring means for measuring temperature of said batteries, said temperature measuring means being in data connection with said MCU of said VPSU unit; and,
said method comprises:
charging said batteries with said charge current characterized by a value greater than 1 C;
monitoring said temperature of said batteries; and,
if said temperature of said batteries or a rate of rise of temperature of said batteries exceeds a predetermined limit, reducing said charge current sufficient to reduce said temperature of said batteries or said rate of rise of temperature of said batteries to a value below said predetermined limit.

20. The method according to claim 19, wherein said method comprises:
determining a parameter $\alpha=\Delta V/\Delta I$ where V and I are said charge voltage and charge current, respectively;
determining an ionization factor $F_i=\Delta\alpha/\Delta T$, where T is said battery temperature; and,
using $F_i$ as input to a feedback loop.

* * * * *